(12) United States Patent
Kimishima

(10) Patent No.: US 8,898,009 B2
(45) Date of Patent: Nov. 25, 2014

(54) INFORMATION PROCESSING APPARATUS, INFORMATION PROCESSING METHOD, AND PROGRAM

(71) Applicant: Sony Corporation, Tokyo (JP)

(72) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/828,659

(22) Filed: Mar. 14, 2013

(65) Prior Publication Data

US 2013/0261959 A1    Oct. 3, 2013

(30) Foreign Application Priority Data

Mar. 30, 2012  (JP) ................. 2012-080987

(51) Int. Cl.
| | |
|---|---|
| *G01C 21/00* | (2006.01) |
| *G01S 19/52* | (2010.01) |
| *G01S 19/40* | (2010.01) |
| *G01C 22/00* | (2006.01) |
| *G01S 19/48* | (2010.01) |

(52) U.S. Cl.
CPC ............... *G01C 21/00* (2013.01); *G01S 19/52* (2013.01); *G01S 19/40* (2013.01); *G01C 22/006* (2013.01); *G01S 19/48* (2013.01)
USPC ........................................ 701/445; 701/433

(58) Field of Classification Search
USPC ......... 701/445, 408, 518, 433, 534, 207, 213, 701/214; 702/160; 235/105; 455/115, 424, 455/425
See application file for complete search history.

(56) References Cited

U.S. PATENT DOCUMENTS

| | | | |
|---|---|---|---|
| 6,160,478 A * | 12/2000 | Jacobsen et al. .......... | 340/539.12 |
| 7,532,977 B2 * | 5/2009 | Chen .............................. | 701/433 |
| 7,930,135 B2 * | 4/2011 | Ma et al. ....................... | 702/160 |
| 8,566,019 B2 * | 10/2013 | Yokozawa ..................... | 701/408 |
| 2006/0155510 A1 * | 7/2006 | Chen .............................. | 702/160 |
| 2009/0199105 A1 * | 8/2009 | Kamada et al. ............... | 715/738 |
| 2011/0106487 A1 * | 5/2011 | Kourogi ........................ | 702/142 |
| 2011/0179850 A1 * | 7/2011 | Klinnert et al. ................ | 73/1.37 |

FOREIGN PATENT DOCUMENTS

| | | |
|---|---|---|
| JP | 2000-284041 | 10/2000 |
| JP | 2004113552 A * | 4/2004 |

\* cited by examiner

*Primary Examiner* — Mary Cheung
*Assistant Examiner* — Rodney Butler
(74) *Attorney, Agent, or Firm* — Frommer Lawrence & Haug LLP; William S. Frommer

(57) ABSTRACT

There is provided an information processing apparatus including a speed calculating section configured to calculates a traveling speed of a user based on a signal received from a positioning signal transmitter, a walking tempo acquiring section configured to acquire a walking tempo of the user, and an evaluating section configured to evaluate, based on the walking tempo and the traveling speed, reliability of information calculated by using the signal received from the positioning signal transmitter.

10 Claims, 19 Drawing Sheets

FIG. 2
(PATTERN 1)
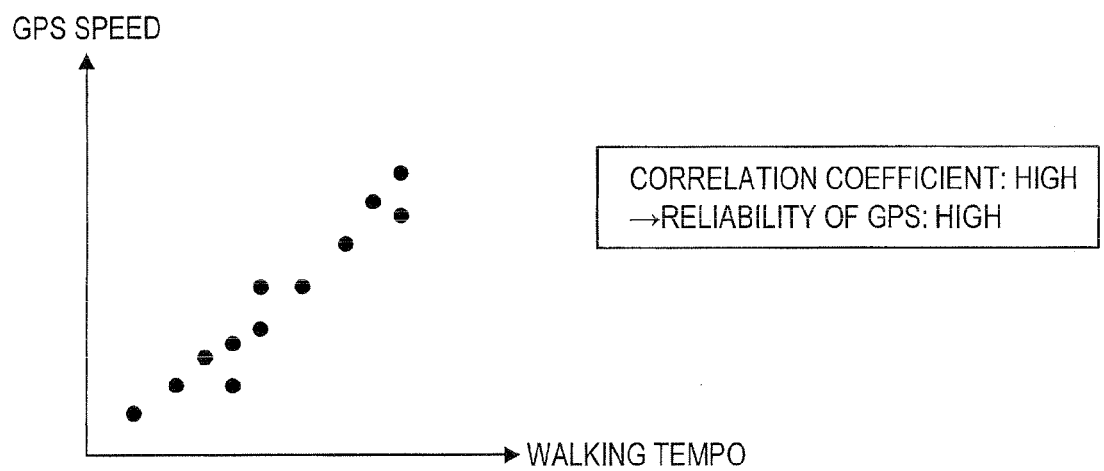
(PATTERN 2)
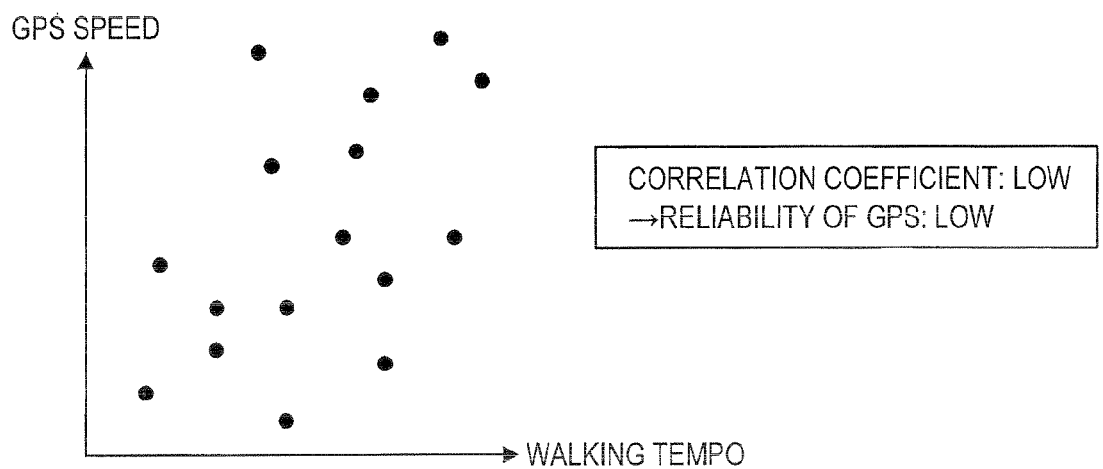

FIG. 3
(PATTERN 1)
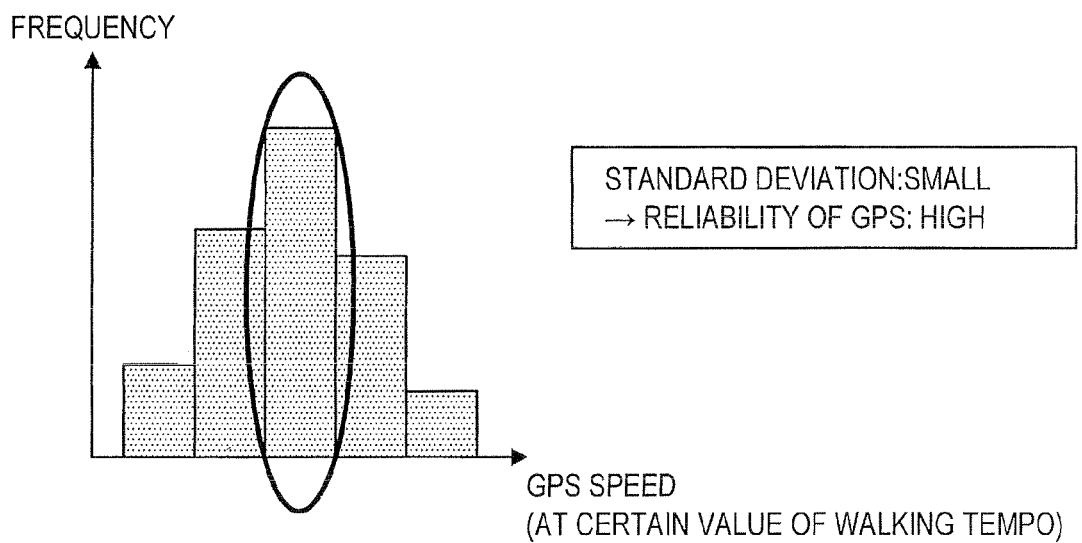
(PATTERN 2)
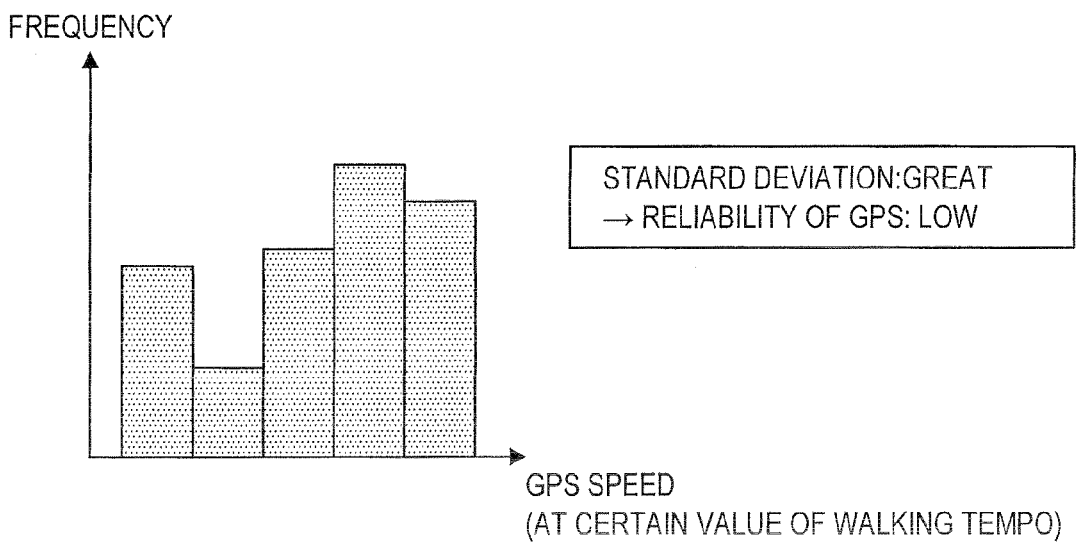

INFORMATION PROCESSING APPARATUS, INFORMATION PROCESSING METHOD, AND PROGRAM

BACKGROUND

The present disclosure relates to an information processing apparatus, an information processing method, and a program.

More and more positioning satellites represented by a GPS (global positioning system) have recently come into wide use. For example, a GPS receiver can acquire a current position, a traveling speed, and an orientation by use of a GPS signal.

Intensity of a signal received from the positioning satellite varies depending on the signal-receiving environment, and precision of acquired information varies depending on the place where the signal is received. For example, Japanese Patent Laid-Open No. 2000-284041 discloses a portable range finder-speedometer that calculates a traveling speed based on the difference in position calculated based on a GPS signal. This portable range finder-speedometer compares a previously calculated traveling speed to a currently calculated traveling speed, so as to determine an abnormal value of the traveling speed. Specifically, this range finder-speedometer determines that the value of the traveling speed is abnormal if the difference in the traveling speed is equal to or more than a threshold value.

SUMMARY

Unfortunately, such a method that determines the abnormal value if the difference in the traveling speed is equal to or more than a threshold value may cause a determination error that the traveling speed is determined to have a normal value if the traveling speed equal to or less than the threshold value is acquired while the device stops. Meanwhile, the traveling speed may be determined to have an abnormal value even if the device is actually traveling at the speed more than the threshold value.

To counter these difficulties, such a new method has been desired that evaluates reliability of data calculated by using a signal received from a positioning signal transmitter with high accuracy.

According to an embodiment of the present disclosure, there is provided an information processing apparatus including a speed calculating section configured to calculates a traveling speed of a user based on a signal received from a positioning signal transmitter, a walking tempo acquiring section configured to acquire a walking tempo of the user, and an evaluating section configured to evaluate, based on the walking tempo and the traveling speed, reliability of information calculated by using the signal received from the positioning signal transmitter.

Further, according to an embodiment of the present disclosure, there is provided an information processing apparatus including a walking tempo acquiring section configured to acquire a walking tempo of a user, a traveling speed acquiring section configured to acquire a traveling speed extracted, based on the walking tempo acquired by the walking tempo acquiring section, from an association table between the traveling speed and the walking tempo generated by using the traveling speed whose reliability is evaluated based on a correlation between the traveling speed calculated based on a signal received from a positioning signal transmitter and the walking tempo, and a position calculating section configured to calculate the position of the user based on the traveling speed.

Further, according to an embodiment of the present disclosure, there is provided an information processing method including calculating a traveling speed of a user based on a signal received from a positioning signal transmitter, acquiring a walking tempo of the user, and evaluating, based on the walking tempo and the traveling speed, reliability of information calculated by using the signal received from the positioning signal transmitter.

Further, according to an embodiment of the present disclosure, there is provided a program allowing a computer to function as an information processing apparatus, the information processing apparatus including a speed calculating section configured to calculates a traveling speed of a user based on a signal received from a positioning signal transmitter, a walking tempo acquiring section configured to acquire a walking tempo of the user, and an evaluating section configured to evaluate, based on the walking tempo and the traveling speed, reliability of information calculated by using the signal received from the positioning signal transmitter.

As described above, the present disclosure realizes evaluation on reliability of information calculated by using a signal received from a positioning signal transmitter with high accuracy.

BRIEF DESCRIPTION OF THE DRAWINGS

FIG. 2 is an explanatory drawing showing an outline of the reliability evaluation according to the present embodiment, in which variation in the walking tempo is great;

FIG. 3 is an explanatory drawing showing an outline of the reliability evaluation according to the present embodiment, in which variation in the walking tempo is small;

DETAILED DESCRIPTION OF THE EMBODIMENTS

Figure 1:
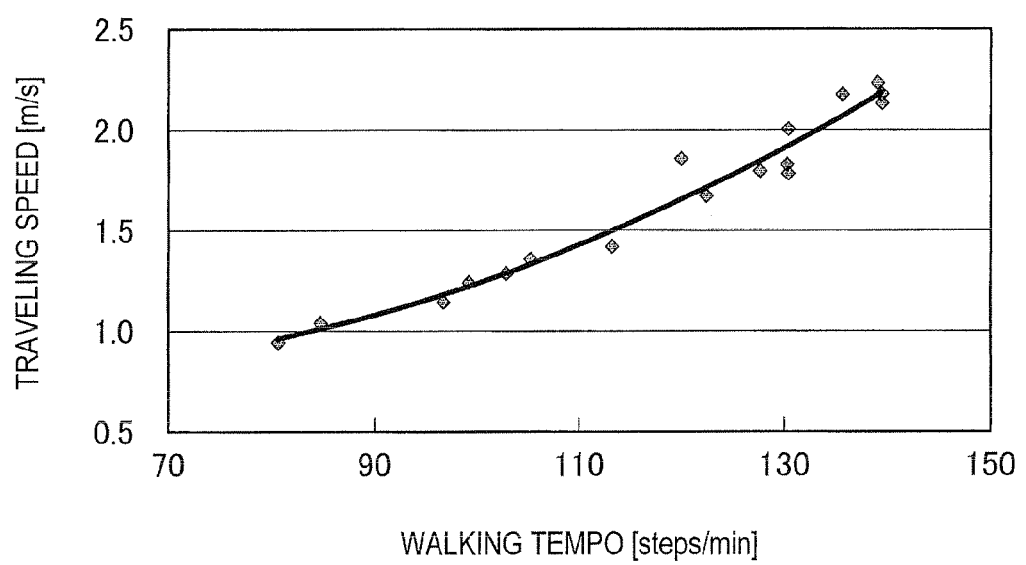
FIG. 1 is a graph showing a relation between a walking tempo and a traveling speed, which is used in reliability evaluation according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, description will be provided in the following order.
1. Outline
2. Example of configuration
3. Example of operation
4. Verification of effects
5. Example of other applications of reliability evaluation
<1. Outline>

Referring to FIG. 1 to FIG. 3, description will be provided on an outline of reliability evaluation according to one embodiment of the present disclosure. This evaluating method evaluates reliability of information such as positional information, speed information and orientation information, which are calculated by using a signal received from a positioning signal transmitter. FIG. 1 is a graph showing a relation between a walking tempo and a traveling speed, which is used in the reliability evaluation according to one embodiment of the present disclosure. FIG. 2 is an explanatory drawing showing an outline of the reliability evaluation according to the present embodiment, in which variation in the walking tempo is great. FIG. 3 is an explanatory drawing showing an outline of the reliability evaluation according to the present embodiment, in which variation in the walking tempo is small.

Recently, there have been suggested various methods of acquiring the positional information. A representative example of the positioning scheme may be GPS positioning using a GPS satellite. WiFi positioning has also been come into wide use, which calculates the positional information by utilizing intensity of a received WiFi radio wave. The GPS positioning and the WiFi positioning become unavailable at a place where the GPS signal or the WiFi radio wave is not received. To counter this difficulty, an autonomous navigation using various sensors has been suggested. The autonomous navigation uses an output value of a sensor to find a relative position from a certain position, thereby acquiring current positional information.

In the autonomous navigation, a relative position from a previously acquired position is calculated by using the traveling speed and the traveling direction, so as to acquire the current position. In the case of walking autonomy, the traveling speed can be acquired based on the walking tempo if the traveling speed is directly unavailable. There is a strong correlation between the walking tempo and the traveling speed. Hence, information showing correspondence between the walking tempo and the traveling speed as shown in FIG. 1, for example, is generated in advance so that the traveling speed corresponding to the walking tempo obtained from a pedometer can be acquired.

The correspondence between the walking tempo and the traveling speed varies depending on the user. Hence, the correspondence is learned for each user. In this learning, positional information acquired by using the GPS speed or the GPS positioning is often used for the traveling speed. Unfortunately, the intensity of the received GPS signal significantly varies depending on the signal-receiving environment as described above. Intensity of the received signal becomes deteriorated particularly in an environment with high defilade in the sky. For example, an example of a place equivalent to the environment with high defilade in the sky may include a building street and a place under a tree. An example of information acquired from the received GPS signal may include a current position, a traveling speed, and an orientation. Information acquired in a poor signal-receiving environment has a low reliability.

The present disclosure proposes a method of evaluating the reliability of information acquired from the received GPS signal by using the walking tempo as an index of the reliability. As described above, it has been experimentally proved that there is a strong correlation between the walking tempo and the traveling speed. In the reliability evaluation according to an embodiment of the present disclosure, the reliability of the GPS speed is determined to be high if the correlation between the walking tempo and this GPS speed of interest is high. If the walking tempo is used as the index of the reliability, it is possible to omit the GPS speed having low reliability because the device is supposed to stop if the device is located in an area where the walking tempo is zero, and if the GPS speed acquired in this area has a value other than zero, this GPS speed can be determined to have low reliability.

For example, FIG. 2 shows an example of the correspondence between the walking tempo and the GPS speed corresponding to this walking tempo. It can be evaluated that the reliability of the GPS is high if the correlation coefficient is high as shown in the pattern 1, that is, the GPS speed has a tendency to monotonically increase along with increase of the walking tempo. It can be evaluated that the reliability of the GPS is low if the correlation coefficient is low as shown in the pattern 2. In the case in which the walking tempo of the user in an area where information is acquired relatively varies, the reliability of the GPS can be evaluated in this manner.

Meanwhile, FIG. 3 shows an example of the frequency of appearance of the GPS speed at a particular value of the walking tempo. As shown in the pattern 1, if the standard deviation is small, that is, the GPS speed varies a little, and the frequency of appearance has its peak in the vicinity of a particular GPS speed, it can be evaluated that the reliability of the GPS is high. As shown in the pattern 2, if the standard deviation is great, that is, the GPS speed varies greatly, it can be evaluated that the reliability of GPS is low.

Hereinafter, an example using the GPS will be described, but the technical scope of the present disclosure is not limited to this example. The present disclosure is applicable to general information processing apparatuses using various positioning signal transmitters such as the GPS. An example of the positioning signal transmitter may include various positioning satellites such as GALILEO, GLONASS, HOKUTO, and MICHIBIKI, etc. In this case, one satellite may be used as the positioning satellite, or positioning signals from plural satellites may be used in combination thereof. An example of the positioning signal transmitter other than the positioning satellite may include various positioning signal transmitters for use in the indoor positioning. For example, an example of a technique for use in the indoor positioning may include IMES (indoor messaging system) that is also referred to as an indoor GPS, visible light communication, infrared communication, an RFID (radio frequency identification) tag, a QR (quick response) code, etc. The configuration of the structural elements to be used may be appropriately changed in accordance with the technical level at the time of carrying out the technique.

<2. Example of Configuration>

Figure 4:
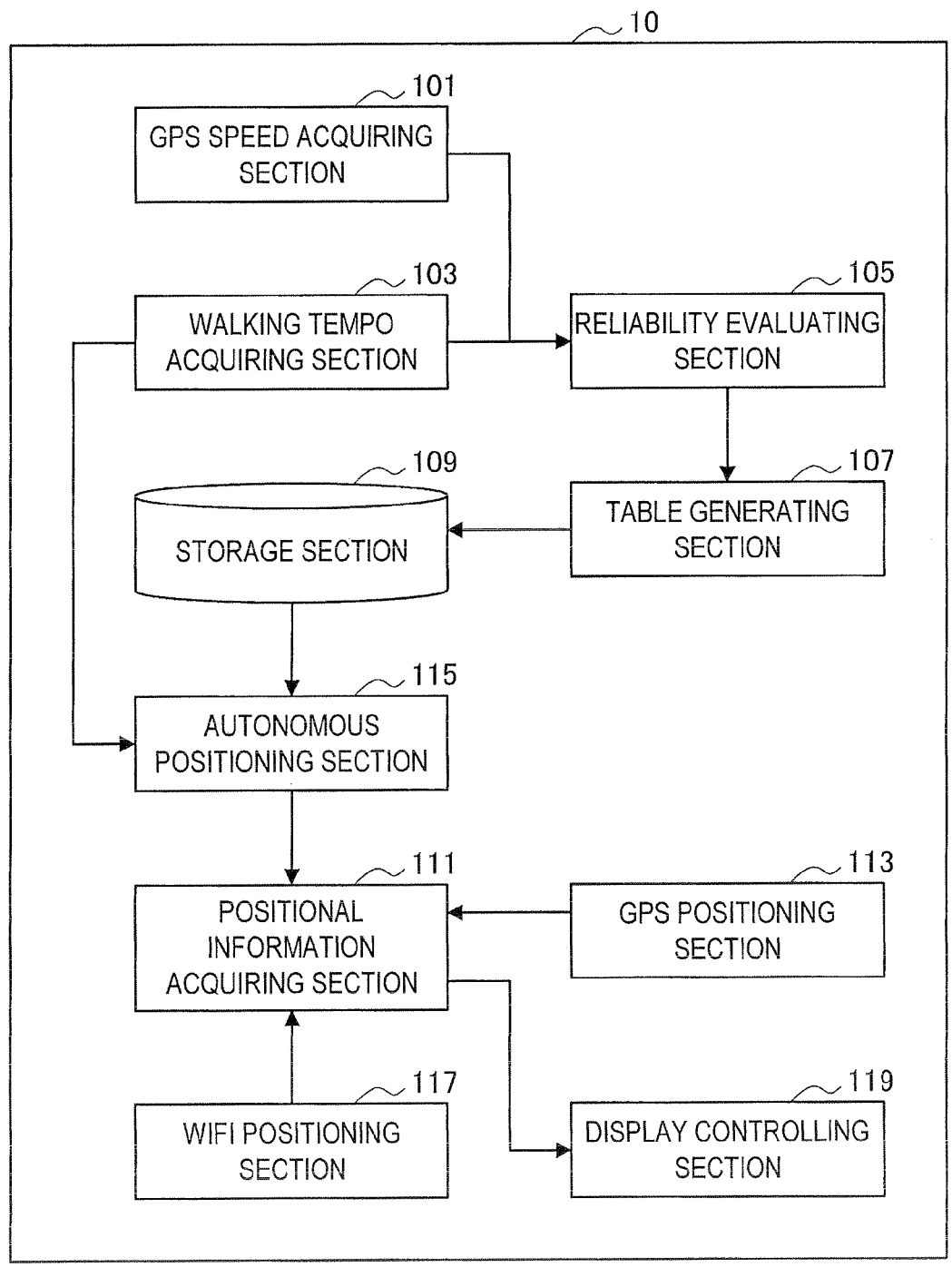
FIG. 4 is a block diagram showing an example of a functional configuration of a mobile terminal according to the present embodiment.
Figure 5:
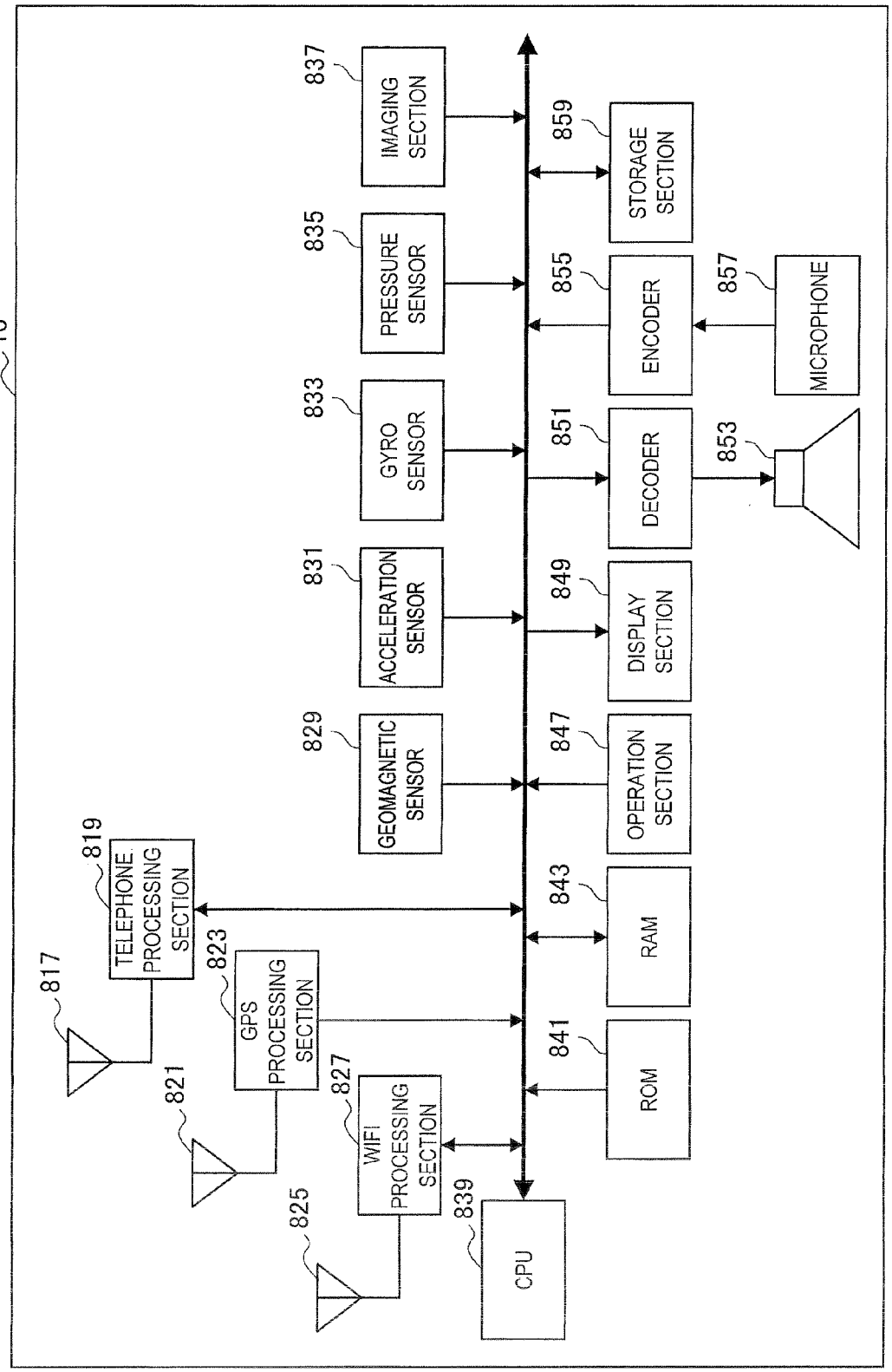
FIG. 5 is a block diagram showing an example of a hardware configuration of the mobile terminal according to the present embodiment.

Referring to FIG. 4 and FIG. 5, description will be provided on one example of the functional configuration and the hardware configuration of a mobile terminal 10 that carries out the reliability evaluation according to the present embodiment. FIG. 4 is a block diagram showing an example of the functional configuration of the mobile terminal according to the present embodiment. FIG. 5 is a block diagram showing an example of the hardware configuration of the mobile terminal according to the present embodiment.

The mobile terminal 10 herein is a portable information processing apparatus including a GPS receiver. The mobile terminal 10 may be a mobile phone including a smart phone, a tablet terminal, a note PC (personal computer), an image processing device, a game machine, a music reproducing device, etc., for example.

Referring to FIG. 4, the mobile terminal 10 mainly includes a GPS speed acquiring section 101, a walking tempo acquiring section 103, a reliability evaluating section 105, a table generating section 107, a storage section 109, a positional information acquiring section 111, a GPS positioning section 113, an autonomous positioning section 115, a WiFi positioning section 117, and a display controlling section 119.

(GPS Speed Acquiring Section 101)

The GPS speed acquiring section 101 has a function of acquiring the GPS speed calculated using a GPS satellite, which is the traveling speed of the mobile terminal 10. The GPS speed is measured by using the Doppler effect of carrier waves of the GPS satellite. The GPS speed acquiring section 101 may acquire, as the GPS speed, a speed obtained from the difference in the current position calculated based on the signal received from the GPS satellite. The GPS speed acquiring section 101 can supply the reliability evaluating section 105 with the acquired GPS speed.

(Walking Tempo Acquiring Section 103)

The walking tempo acquiring section 103 has a function of acquiring the walking tempo of the user who carries the mobile terminal 10. The walking tempo acquiring section 103 can calculate the walking tempo by dividing a value of the number of steps acquired on a swing detecting sensor such as an acceleration sensor by time. The walking tempo acquiring section 103 can supply the reliability evaluating section 105 with the value of the acquired walking tempo.

(Reliability Evaluating Section 105)

The reliability evaluating section 105 is an example of an evaluating section for evaluating the reliability of information calculated by using the walking tempo based on the signal received from the GPS satellite. The reliability evaluating section 105 evaluates the reliability of the GPS speed by using the walking tempo. Specifically, the reliability evaluating section 105 can evaluate the reliability of the GPS speed based on the correlation between the walking tempo and the GPS speed. The reliability evaluating section 105 can evaluate that the reliability of the GPS speed is high if the GPS speed has correlation with the walking tempo. The reliability evaluating section 105 can evaluate that the reliability of the GPS speed is low if the correlation between the GPS speed and the walking tempo is low.

The reliability evaluating section 105 can distinguish the evaluation processing depending on the dispersion of the walking tempo. Specifically, if the dispersion of the walking tempo is equal to or more than a certain level, the reliability evaluating section 105 can evaluate the reliability of the GPS speed by using a correlation coefficient between the walking tempo and the GPS speed as shown in FIG. 2. The reliability evaluating section 105 generates an association table by using the walking tempo and the GPS speed if the correlation coefficient between this walking tempo and this GPS speed is equal to or more than a threshold value. The reliability evaluating section 105 can evaluate the reliability of the GPS speed by using a frequency distribution of the GPS speed at a particular walking tempo as shown in FIG. 3 if the walking tempo has the dispersion less than the certain level. At this time, the reliability evaluating section 105 can generate the association table by using the GPS speed whose frequency is at its peak if the GPS speed has dispersion of the frequency equal to or less than a predetermined value. The dispersion of the GPS speed may be evaluated by using a standard deviation, for example. The reliability evaluating section 105 can supply the table generating section 107 with a result of the reliability evaluation.

(Table Generating Section 107)

The table generating section 107 is an example of an association table generating section for generating the association table between the walking tempo and the traveling speed. The table generating section 107 can generate the association table based on the evaluation result of the reliability evaluating section 105. The table generating section 107 generates the table by using the GPS speed determined to have a high reliability. For example, if acquired data regarding the walking tempo and the GPS speed in a certain area has the walking tempo whose dispersion is equal to or more than the predetermined value, and the correlation coefficient between the walking tempo and the GPS speed is equal to or more than the certain level, the table generating section 107 can generate the table by using the acquired data. For example, the table generating section 107 can generate an approximate curve of the acquired data, and stores this generated approximate curve as a table. The table generating section 107 can record the peak value of the GPS speed and the walking tempo as a table value if this GPS speed has the walking tempo whose dispersion is equal to or less than the predetermined value in a certain area, and the dispersion of the GPS speed at a certain walking tempo is small.

(Storage Section 109)

The storage section 109 is an example of the table storage section for storing the association table between the walking tempo and the traveling speed. The storage section 109 is a device for storing data, and may include a storage medium, a recording device for recording data on a storage medium, a device for reading data from a storage medium, and a device for deleting data recorded on a storage medium, and others. A nonvolatile memory such as a flash memory, an MRAM (magnetoresistive random access memory), a FeRAM (ferroelectric random access memory), a PRAM (phase change random access memory), and a magnetic media such as a HDD (hard disk drive) may be used as the storage medium herein, for example.

(Positional Information Acquiring Section 111)

The positional information acquiring section 111 has a function of acquiring current positional information of the mobile terminal 10. The positional information acquiring section 111 can acquire the positional information based on information supplied from the GPS positioning section 113, the autonomous positioning section 115, and the WiFi positioning section 117. The positional information acquiring section 111 may use the positioning scheme having the next highest priority if the positioning scheme having the highest priority is unavailable based on the utilization priority among the GPS positioning, the autonomous positioning, and WiFi positioning, for example. This priority may be determined based on the precision of the positional information. The positional information acquiring section 111 may be part of a function of a service using the positional information. An example of the service using the positional information may include a navigation of providing a rout guide to a destination, a life log of recording traveling histories, and a SNS (social network service) capable of positing a contribution having current positional information, etc.

(GPS Positioning Section 113)

The GPS positioning section 113 is an example of the satellite positioning section for positioning the current position of the mobile terminal 10 based on the signal received from the positioning signal transmitter. The GPS positioning section 113 may include a GPS antenna, a GPS processing section for calculating the current position based on the GPS signal received on the GPS antenna, for example. The GPS positioning section 113 can supply the positional information acquiring section 111 with the positional information of the mobile terminal 10.

(Autonomous Positioning Section 115)

The autonomous positioning section 115 is a positioning section for acquiring the current position through the autonomous navigation. The autonomous positioning section 115 acquires the current positional information by calculating the relative position using the association table between the walking tempo and the traveling speed that is stored on the storage section 109. The autonomous positioning section 115 counts the number of the user's steps using a detecting device such as an acceleration sensor for detecting the swing of the user, and calculates the walking tempo by dividing the number of the steps by the time. The autonomous positioning section 115 then extracts the traveling speed corresponding to the calculated walking tempo from the association table. The autonomous positioning section 115 can calculate the current position by using the extracted traveling speed. The autonomous positioning section 115 can supply the positional information acquiring section 111 with the calculated positional information.

(WiFi Positioning Section 117)

The WiFi positioning section 117 has a function of acquiring the current positional information of the mobile terminal 10 based on the intensity of the received WiFi radio wave. The WiFi positioning section 117 may include a WiFi antenna, and a WiFi processing section for processing the WiFi radio wave received on the WiFi antenna. The WiFi positioning section 117 can supply the positional information acquiring section 111 with the acquired positional information.

(Display Controlling Section 119)

The display controlling section 119 has a function of carrying out display control on a display screen of the mobile terminal 10 for providing the user with various information.

The display controlling section 119 can display in a superimposed manner the current position of the user on a map based on the positional information acquired on the positional information acquiring section 111, for example.

Heretofore, examples of functions of the mobile terminal 10 according to the present embodiment have been shown. Each of the above structural elements may be configured using general-purpose members or circuits, or may be configured using hardware specialized for the function of each structural element. Further, the function of each structural element may be realized by reading, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing respective functions of the mobile terminal 10 according to the embodiments of the present disclosure as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example. Hereinafter, there will be described an example of a hardware configuration for realizing the functions described above.

Next, referring to FIG. 5, an example of a hardware configuration of the mobile terminal 10 according to an embodiment of the present disclosure will be explained. FIG. 5 is a block diagram showing a hardware configuration of the mobile terminal according to the embodiment.

First, an example of a configuration of a mobile terminal 10 will be described. Referring to FIG. 5, the mobile terminal 10 includes, for example, a telephone network antenna 817, a telephone processing section 819, a GPS antenna 821, a GPS processing section 823, a WiFi antenna 825, a WiFi processing section 827, a geomagnetic sensor 829, an acceleration sensor 831, a gyro sensor 833, a pressure sensor 835, an imaging section 837, a CPU (Central Processing Unit) 839, a ROM (Read Only Memory) 841, a RAM (Random Access Memory) 843, an operation section 847, a display section 849, a decoder 851, a speaker 853, an encoder 855, a microphone 857, and a storage section 859. Note that the hardware configuration shown here is merely an example, and some of the structural elements may be omitted. Further, the hardware configuration may of course include structural elements other than the above-mentioned structural elements.

(Telephone Network Antenna 817)

The telephone network antenna 817 is an example of an antenna having a function of establishing a connection via radio waves with a mobile phone network for telephone call and data communication. The telephone network antenna 817 can supply the telephone processing section 819 with a telephone call signal received through the mobile phone network.

(Telephone Processing Section 819)

The telephone processing section 819 has a function of performing various types of signal processing on a signal transmitted/received by the telephone network antenna 817. For example, the telephone processing section 819 can perform various types of processing on an audio signal which is input through the microphone 857 and encoded by the encoder 855, and can supply the telephone network antenna 817 with the audio signal. Further, the telephone processing section 819 can perform various types of processing on an audio signal supplied by the telephone network antenna 817, and can supply the decoder 851 with the audio signal.

(GPS Antenna 821)

The GPS antenna 821 is an example of an antenna which receives a signal from a positioning satellite. The GPS antenna 821 is capable of receiving GPS signals from multiple GPS satellites, and inputs the received GPS signals to the GPS processing section 823.

(GPS Processing Section 823)

The GPS processing section 823 is an example of a calculation section which calculates location information based on the signals received from the positioning satellites. The GPS processing section 823 calculates current location information based on the multiple GPS signals input from the GPS antenna 821, and outputs the calculated location information. To be specific, the GPS processing section 823 calculates positions of the respective GPS satellites based on the orbital data of the GPS satellites, and calculates distances from the respective GPS satellites to the mobile terminal 10 based on the differences between transmission time and reception time of the GPS signals. Then, based on the calculated positions of the respective GPS satellites and the calculated distances from the respective GPS satellites to the mobile terminal 10, a current three-dimensional position can be calculated. Note that the orbital data of GPS satellites used here may be included in the GPS signals, for example. Alternatively, the orbital data of GPS satellites may be acquired from an external server via the communication antenna 825.

(WiFi Antenna 825)

The WiFi antenna 825 is an antenna having a function of transmitting/receiving a communication signal to/from a wireless local area network (LAN) communication network in accordance with the WiFi specification, for example. The WiFi antenna 825 can supply the WiFi processing section 827 with the received signal.

(WiFi Processing Section 827)

The WiFi processing section 827 has a function of performing various types of signal processing on the signal supplied by the WiFi antenna 825. The WiFi processing section 827 can supply the CPU 839 with a digital signal generated from the supplied analog signal.

(Geomagnetic Sensor 829)

The geomagnetic sensor 829 is a sensor for detecting geomagnetism as a voltage value. The geomagnetic sensor 829 may be a 3-axis geomagnetic sensor which detects geomagnetism in the X-axis direction, the Y-axis direction, and the Z-axis direction. The geomagnetic sensor 829 can supply the CPU 839 with the detected geomagnetic data.

(Acceleration Sensor 831)

The acceleration sensor 831 is a sensor for detecting acceleration as a voltage value. The acceleration sensor 831 may be a 3-axis acceleration sensor which detects acceleration along the X-axis direction, acceleration along the Y-axis direction, and acceleration along the Z-axis direction. The acceleration sensor 831 can supply the CPU 839 with the detected acceleration data.

(Gyro Sensor 833)

The gyro sensor 833 is a measuring instrument for detecting an angle or an angular velocity of an object. The gyro sensor 833 may be a 3-axis gyro sensor which detects a variable velocity (angular velocity) of the rotation angle around each of the X-axis, the Y-axis, and the Z-axis as a voltage value. The gyro sensor 833 can supply the CPU 839 with the detected angular velocity data.

(Pressure Sensor 835)

The pressure sensor 835 is a sensor for detecting the surrounding pressure as a voltage value. The pressure sensor 835 detects a pressure at a predetermined sampling frequency, and can supply the CPU 839 with the detected pressure data.

(Imaging Section 837)

The imaging section 837 has a function of capturing a still image or a moving image via a lens in accordance with control of the CPU 839. The imaging section 837 may cause the storage section 859 to store the captured image.

(CPU 839)

The CPU 839 functions as an arithmetic processing unit and a control unit, and controls the overall operation inside the mobile terminal 10 in accordance with various programs. Further, the CPU 839 may be a microprocessor. The CPU 839 can realize various functions in accordance with various programs.

(ROM 841, RAM 843)

The ROM 841 can store programs and arithmetic parameters used by the CPU 839. The ROM 841 may store a map database. The RAM 843 can temporarily store programs used during execution of the CPU 839 and parameters that appropriately change during the execution thereof.

(Operation Section 847)

The operation section 847 has a function of generating an input signal used by a user for performing a desired operation. For example, the operation section 847 may be configured from, for example, an input section for inputting information by the user, such as a touch sensor, a mouse, a keyboard, a button, a microphone, a switch, and a lever, and an input control circuit which generates an input signal based on the input by the user and outputs the generated input signal to the CPU 839.

(Display Section 849)

The display section 849 is an example of an output device, and may be a liquid crystal display (LCD) device, an organic light emitting diode (OLED) display device, or the like. The display section 849 displays a screen to the user, and thereby being able to provide information.

(Decoder 851, Speaker 853)

The decoder 851 has a function of performing decoding, analog conversion, and the like of input data in accordance with the control of the CPU 839. The decoder 851 can perform decoding, analog conversion, and the like of audio data input through the telephone network antenna 817 and the telephone processing section 819, and can output an audio signal to the speaker 853, for example. Further, the decoder 851 can perform decoding, analog conversion, and the like of audio data input through the WiFi antenna 825 and the WiFi processing section 827, and can output an audio signal to the speaker 853, for example. The speaker 853 can output the audio based on the audio signal supplied from the decoder 851.

(Encoder 855, Microphone 857)

The encoder 855 has a function of performing digital conversion, encoding, and the like of input data in accordance with the control of the CPU 839. The encoder 855 can perform digital conversion, encoding, and the like of an audio signal input from the microphone 857, and can output audio data. The microphone 857 can collect audio and output the audio as an audio signal.

(Storage Section 859)

The storage section 859 is a device for storing data, and can include a storage medium, a recording device for recording data in the storage medium, a reading device for reading the data from the storage medium, and a deletion device for deleting the data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD).

<3. Example of Operation>

Figure 6:
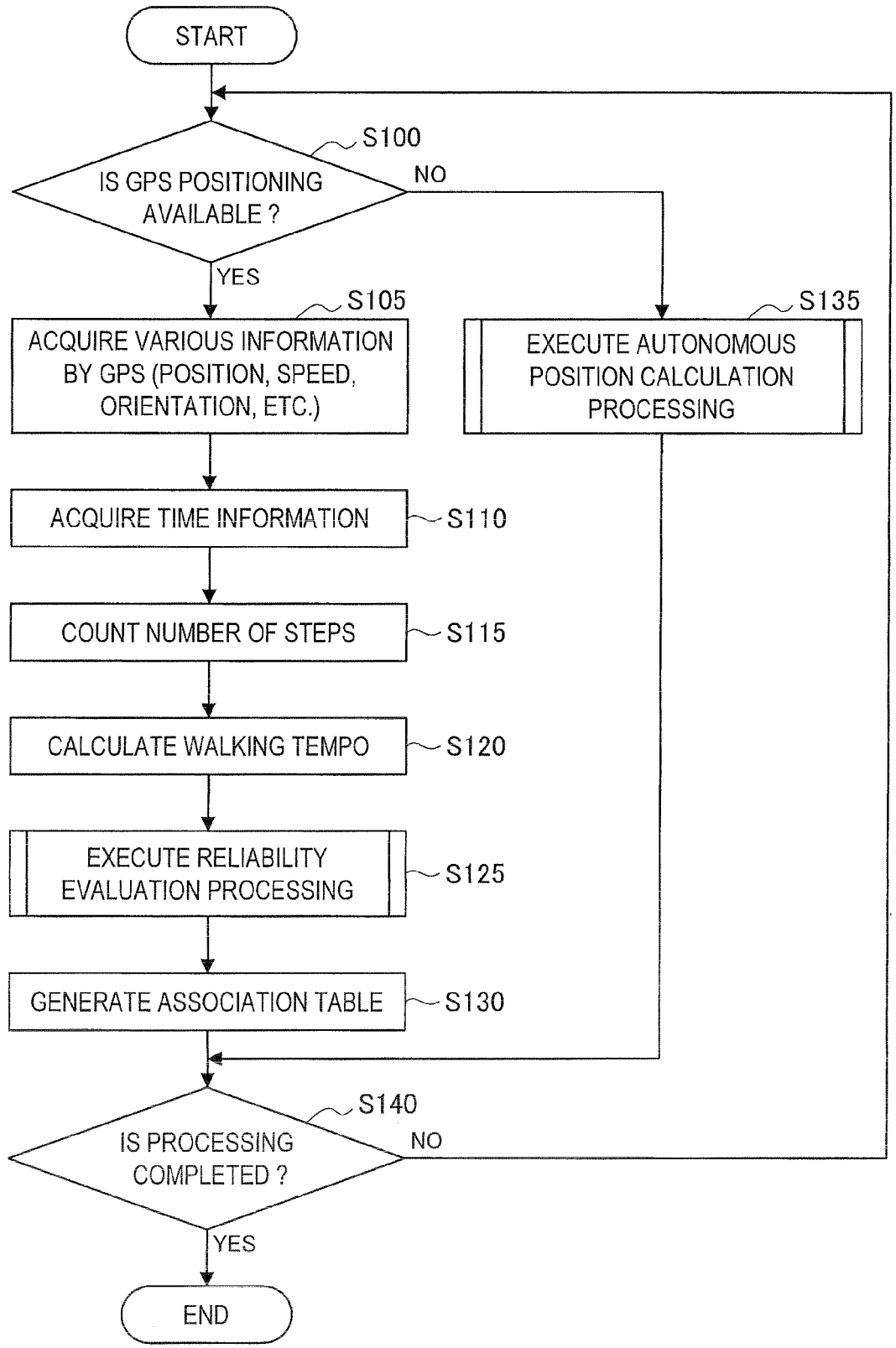
FIG. 6 is a flow chart showing a main flow of the mobile terminal according to the present embodiment.
Figure 7:
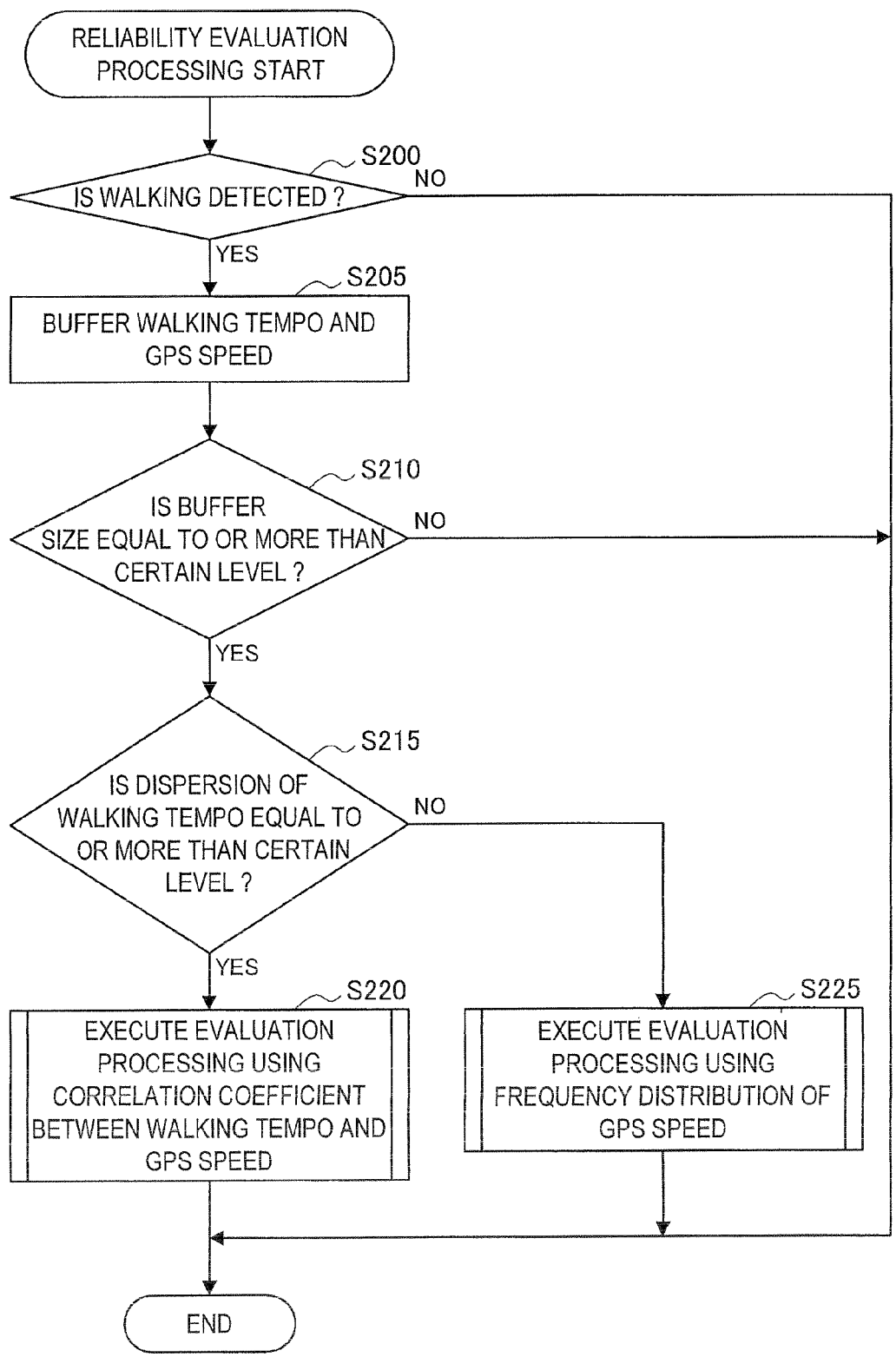
FIG. 7 is a flow chart showing an operation of reliability evaluation processing of the mobile terminal according to the present embodiment.
Figure 8:
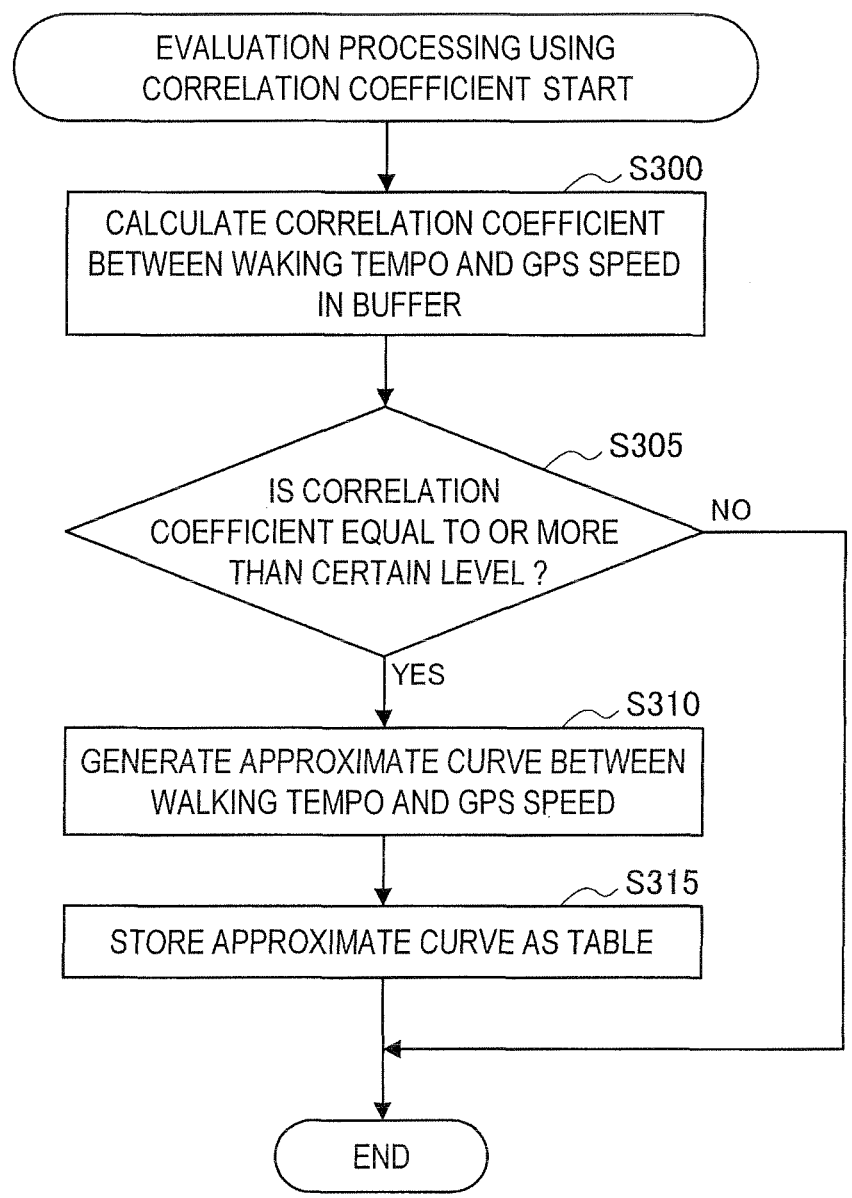
FIG. 8 is a flow chart showing an operation of the evaluation processing using a correlation coefficient of the mobile terminal according to the present embodiment.
Figure 9:
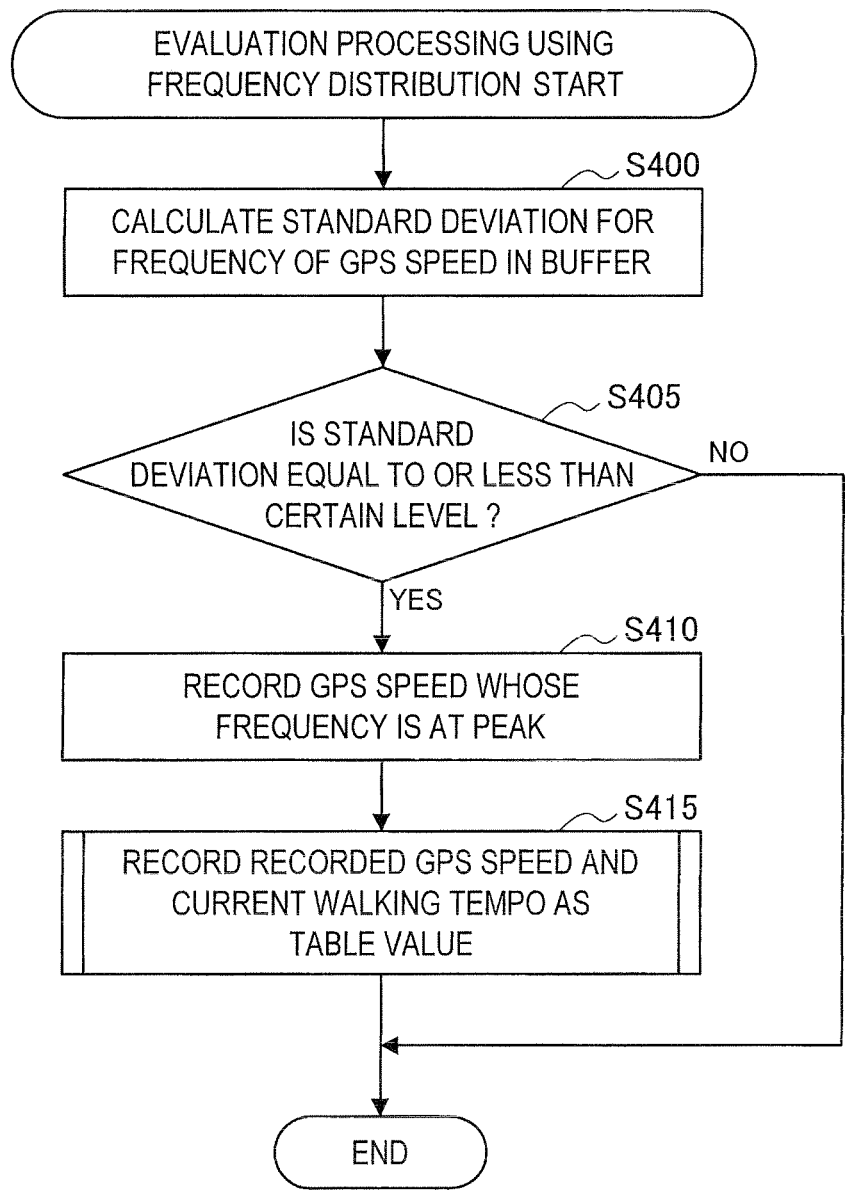
FIG. 9 is a flow chart showing an operation of the evaluation processing using frequency distribution of the mobile terminal according to the present embodiment.
Figure 10:
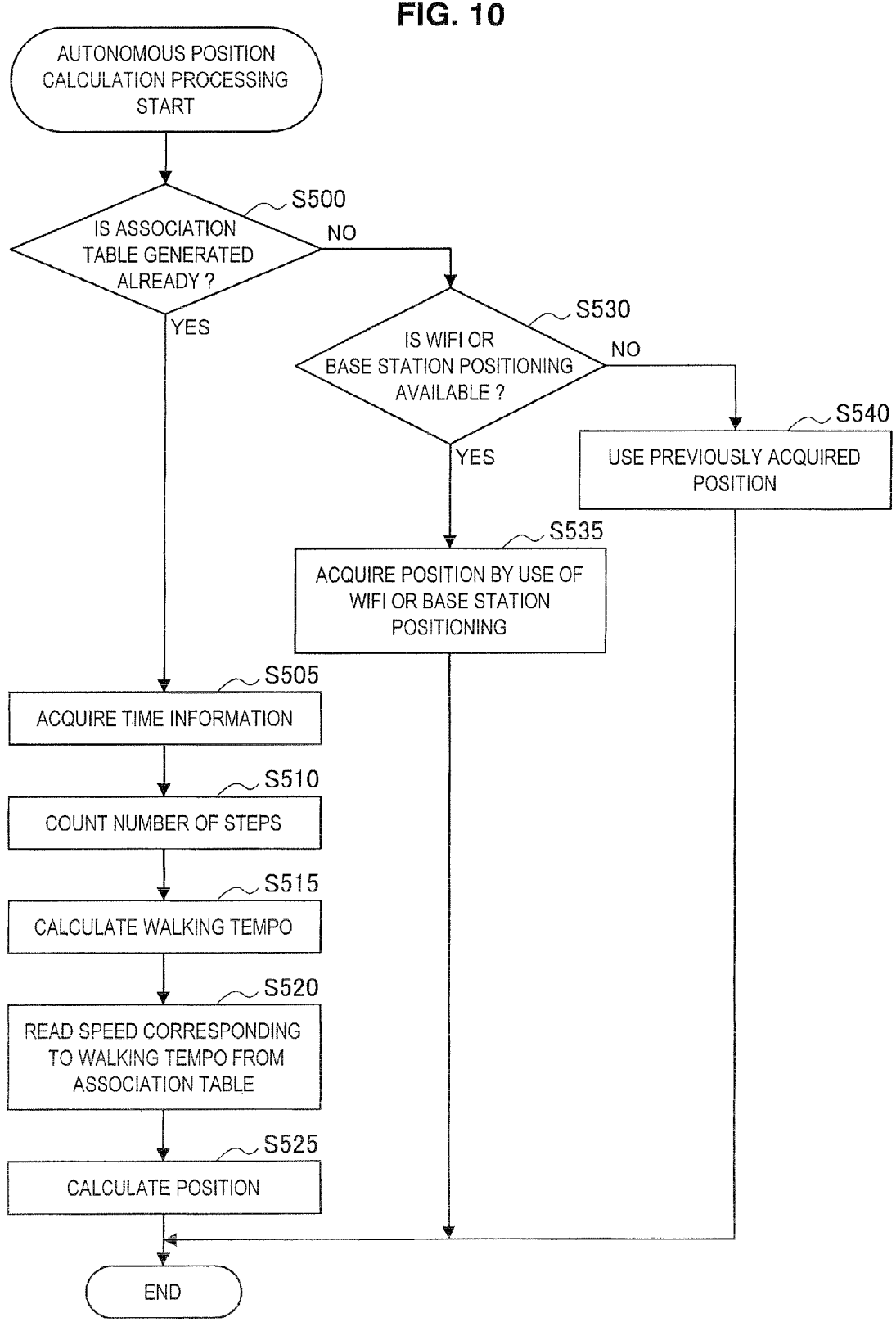
FIG. 10 is a flow chart showing an operation of autonomous position calculation processing of the mobile terminal according to the present embodiment.

Referring to FIG. 6 to FIG. 10, an example of the operation of the mobile terminal 10 according to one embodiment of the present disclosure will now be described. FIG. 6 is a flow chart showing a main flow of the mobile terminal according to the present embodiment. FIG. 7 is a flow chart showing the operation of the reliability evaluation processing of the mobile terminal according to the present embodiment. FIG. 8 is a flow chart showing the operation of the evaluation processing using the correlation coefficient of the mobile terminal according to the present embodiment. FIG. 9 is a flow chart showing the operation of the evaluation processing using the frequency distribution of the mobile terminal according to the present embodiment. FIG. 10 is a flow chart showing the operation of the autonomous position calculation processing of the mobile terminal according to the present embodiment.

(Main Flow)

Referring to FIG. 6, the operation of the mobile terminal 10 will now be described. The positional information acquiring section 111 determines whether or not the GPS positioning is available (S100). If it is determined that the GPS positioning is available in this step, the GPS positioning section 113 acquires the positional information through the GPS, and the GPS speed acquiring section 101 acquires the GPS speed (S105). An orientation and others may further be acquired in step S105.

The walking tempo acquiring section 103 acquires time information at the present time (S110). The walking tempo acquiring section 103 acquires the swing detecting data from the acceleration sensor, for example, and counts the number of the steps (S115). The walking tempo acquiring section 103 calculates the walking tempo showing the number of the steps per unit time by dividing the number of the steps by elapsed time based on the time information (S120).

Herein, the reliability evaluation processing of the acquired GPS speed is executed by using the calculated walking tempo (S125). The reliability evaluating processing in step S125 will be described in detail later with reference to FIG. 7 to FIG. 9. The association table is generated based on the result of the reliability evaluation (S130). In the generation of this association table, the association table is generated by using the GPS speed that is determined to have high reliability. On the other hand, if it is determined that the GPS positioning is unavailable in step S100, the autonomous position calculation processing is executed (S135). The detail of the autonomous position calculation processing will be described later with reference to FIG. 10.

Now, it is determined whether or not the processing is completed (S140). The processing starting with step S100 is repetitively executed until it is determined that the processing is completed in step S140.

(Reliability Evaluation Processing)

Referring to FIG. 7, description will be provided on the operation of the reliability evaluation processing of the mobile terminal 10 according to the present embodiment. The reliability evaluating section 105 determines whether or not the walking is detected (S200). If the walking is detected, the reliability evaluating section 105 then buffers the GPS speed acquired from the GPS speed acquiring section 101, and the walking tempo acquired from the walking tempo acquiring section 103 (S205).

The reliability evaluating section 105 determines whether or not the size of this buffer becomes equal to or more than a certain level (S210). If it is determined that the size of the buffer becomes equal to or more than the certain level in step S210, the reliability evaluating section 105 then determines whether or not the dispersion of the walking tempo is equal to or more than the certain level (S215). At this time, the method for the reliability evaluation becomes different depending on whether or not the dispersion of the walking tempo is equal to or more than the certain level in the determination in step S215. If it is determined that the dispersion of the walking tempo is equal to or more than the certain level, the evaluation processing using the correlation coefficient between the walking tempo and the GPS speed is executed (S220). To the contrary, if it is determined that the dispersion of the walking tempo is less than the certain level, the evaluation processing using the frequency distribution of the GPS speed is executed (S225). The detail description of step S220 and S225 will be provided later with reference to FIG. 8 and FIG. 9, respectively.

(Evaluation Processing Using Correlation Coefficient)

Referring to FIG. 8, description will be provided on a sub-flow of the reliability evaluation processing of the mobile terminal 10 according to the present embodiment, which uses the correlation coefficient in the evaluation processing. The reliability evaluating section 105 calculates the correlation coefficient between the walking tempo and the GPS speed in the buffer (S300).

The reliability evaluating section 105 determines whether or not the calculated correlation coefficient is equal to or more than a certain level (S305). The reliability evaluating section 105 evaluates that the reliability of the GPS speed is high if the correlation coefficient is equal to or more than the certain level, and that the reliability of the GPS speed is low if the correlation coefficient is less than the certain level. The reliability evaluating section 105 supplies the table generating section 107 with the result of the evaluation. If the correlation coefficient is equal to or more than the certain level, the table generating section 107 generates the approximate curve between the walking tempo and the GPS sheep in the buffer (S310). The table generating section 107 can employ a least squares method to generate the approximate curve, for example. The table generating section 107 stores the approximate curve as a table on the storage section 109 (S315).

(Evaluation Processing Using Frequency Distribution)

Referring to FIG. 9, description will now be provided on a sub-flow of the reliability evaluation processing of the mobile terminal 10 according to the present embodiment, which uses the frequency distribution in the evaluation processing. The reliability evaluating section 105 calculates the standard deviation for the frequency of the GPS speed in the buffer (S400).

The reliability evaluating section 105 determines whether or not the calculated standard deviation is equal to or less than a certain level (S405). Specifically, the reliability evaluating section 105 determines whether or not the dispersion of the GPS speed corresponding to a particular walking tempo is small. If it is determined that the standard deviation is equal to or less than the certain level, the reliability evaluating section 105 evaluates that the reliability of the GPS speed is high. If it is determined that the standard deviation is more than the certain level, the reliability evaluating section 105 valuates that the reliability of the GPS speed is low. The reliability evaluating section 105 supplies the table generating section 107 with a result of the evaluation.

If the standard deviation is equal to or less than the certain level, that is, the dispersion of the GPS speed corresponding to the particular walling tempo is small, the table generating section 107 records the GPS speed whose frequency is at the peak (S410). The table generating section 107 records the recorded GPS speed and the current walking tempo as a table value (S415).

(Autonomous Position Calculation Processing)

Referring to FIG. 10, the autonomous position calculation processing of the mobile terminal 10 according to the present embodiment will now be described in detail. The positional information acquiring section 111 determines whether or not the association table between the walking tempo and the traveling speed is already generated (S500). If it is determined that the association table is already generated in step S500, the walking tempo acquiring section 103 acquires time information at the present time, and starts measurement of the elapsed time (S505). The walking tempo acquiring section 103 counts the number of the steps (S510). The walking tempo acquiring section 103 calculates the walking tempo by dividing the number of the steps by the elapsed time for traveling by this number of the steps (S515).

The autonomous positioning section 115 acquires the walking tempo calculated on the walking tempo acquiring section 103, and reads the speed corresponding to this walking tempo (S520) from the association table. The autonomous positioning section 115 calculates the current position by using the speed that is read out (S525).

On the other hand, if it is determined that the association table is not yet generated in step S500, the positional information acquiring section 111 determines whether or not the WiFi positioning or a base station positioning is available (S530). The WiFi positioning and the base station positioning is an example of the positioning scheme other than the GPS positioning and the autonomous navigation.

In step S530, if the WiFi positioning or the base station positioning is available in step S530, the positional information acquiring section 111 acquires a position by using one of the WiFi positioning and the base station positioning, which is available (S535). On the other hand, if it is determined that neither the WiFi positioning nor the base station positioning is available, the positional information acquiring section 111 uses a previously acquired position as the current position (S540).

<4. Verification of Effects>

Figure 11:
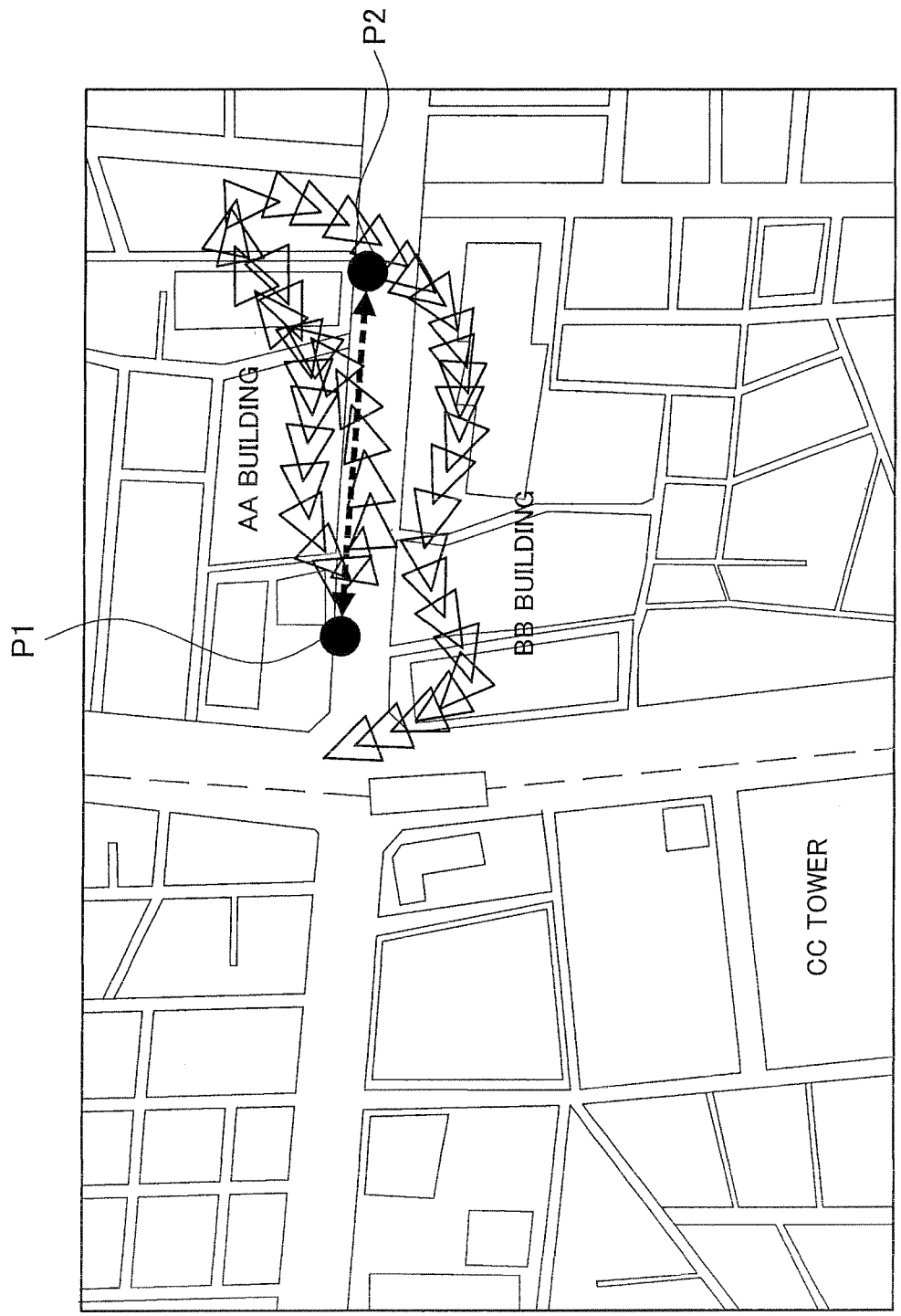
FIG. 11 is an explanatory drawing showing a first condition of a proving test on GPS reliability evaluation of the mobile terminal according to the present embodiment.
Figure 12:
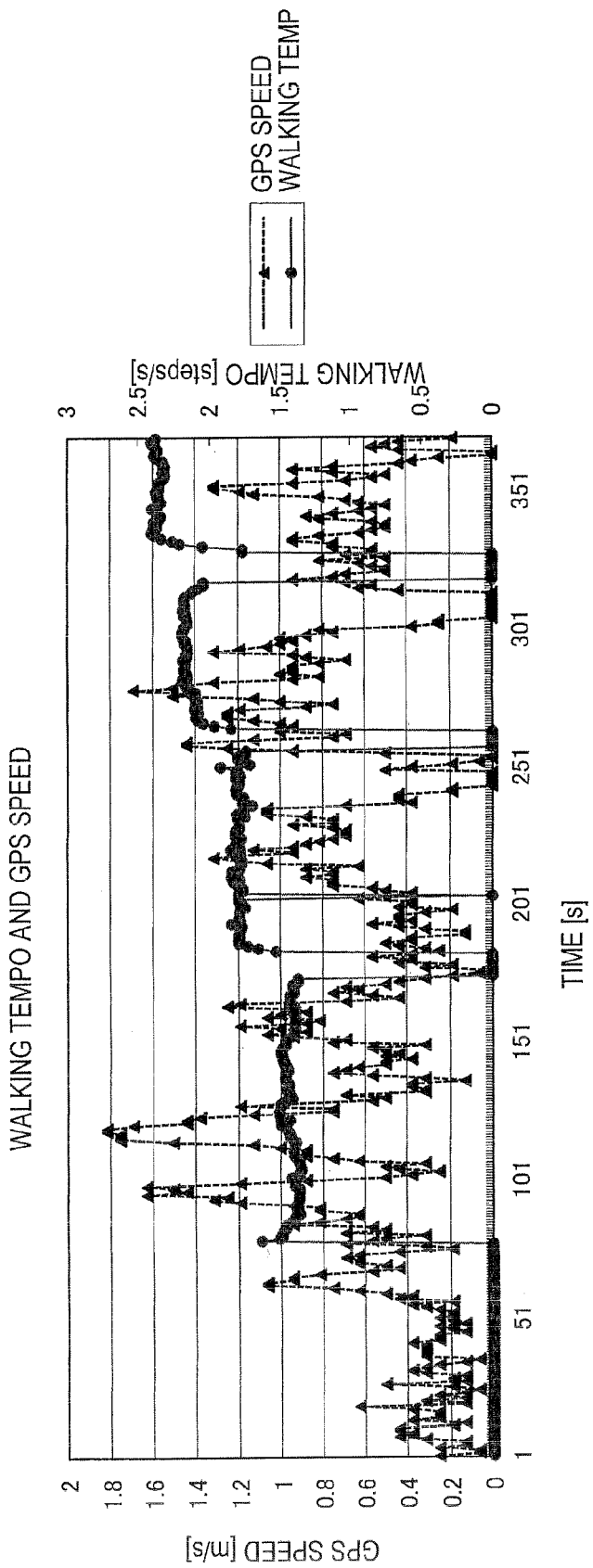
FIG. 12 is a graph showing change in the GPS speed and the walking tempo with time, which is measured under the condition of FIG. 11.
Figure 13:
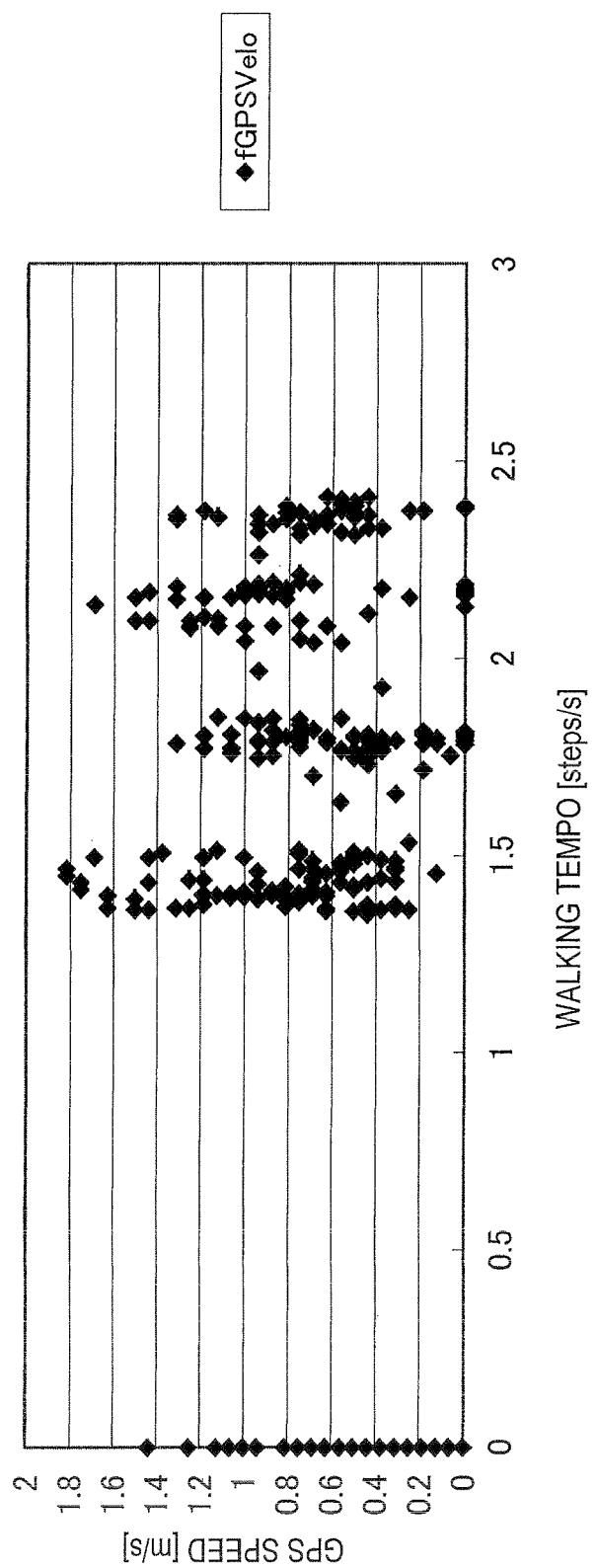
FIG. 13 is a graph showing correspondence between the walking tempo and the GPS speed that are generated by using acquired data of FIG. 12.
Figure 14:
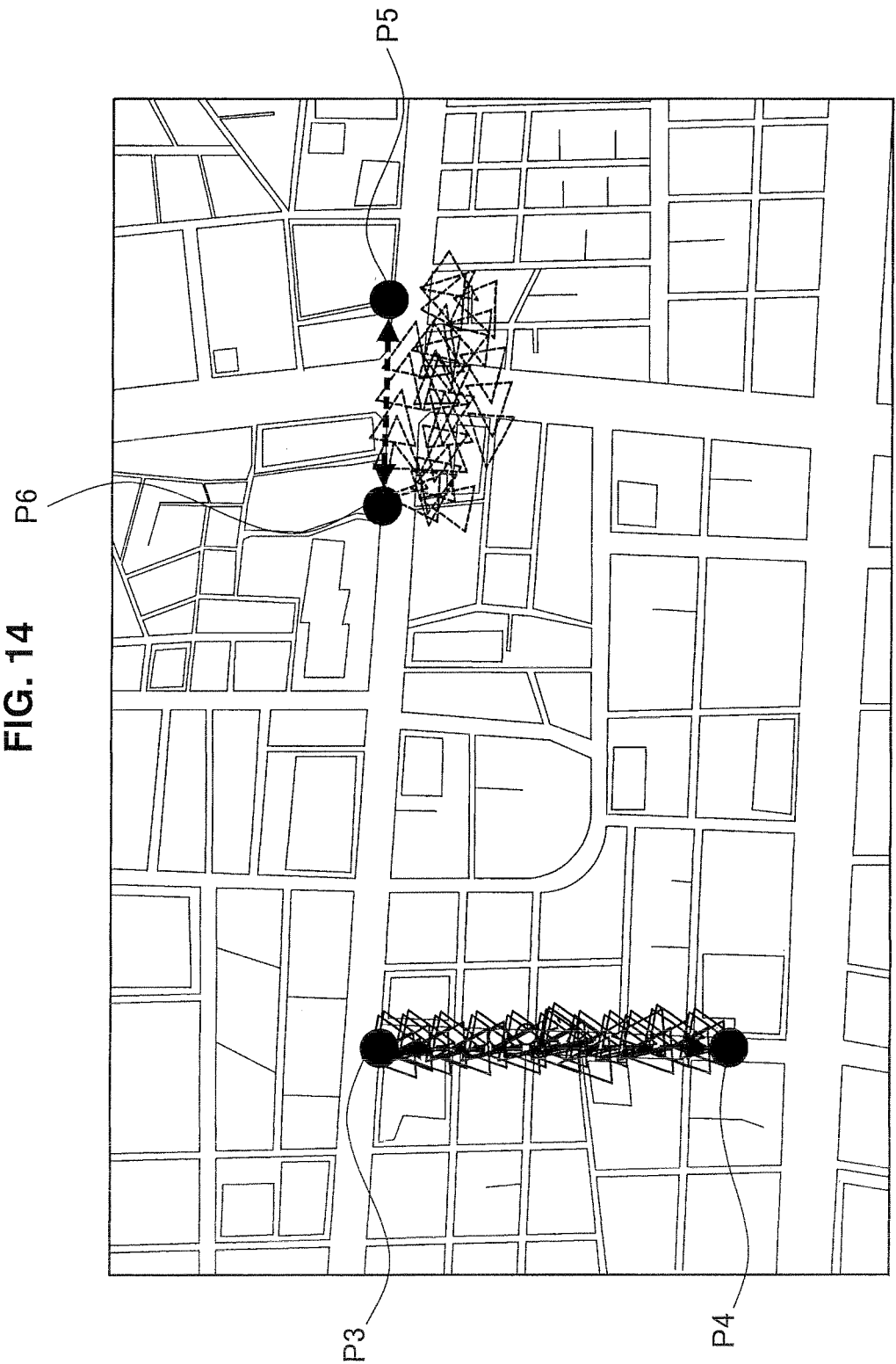
FIG. 14 is an explanatory drawing showing a second condition and a third condition for the proving test on the GPS reliability evaluation of the mobile terminal according to the present embodiment.
Figure 15:
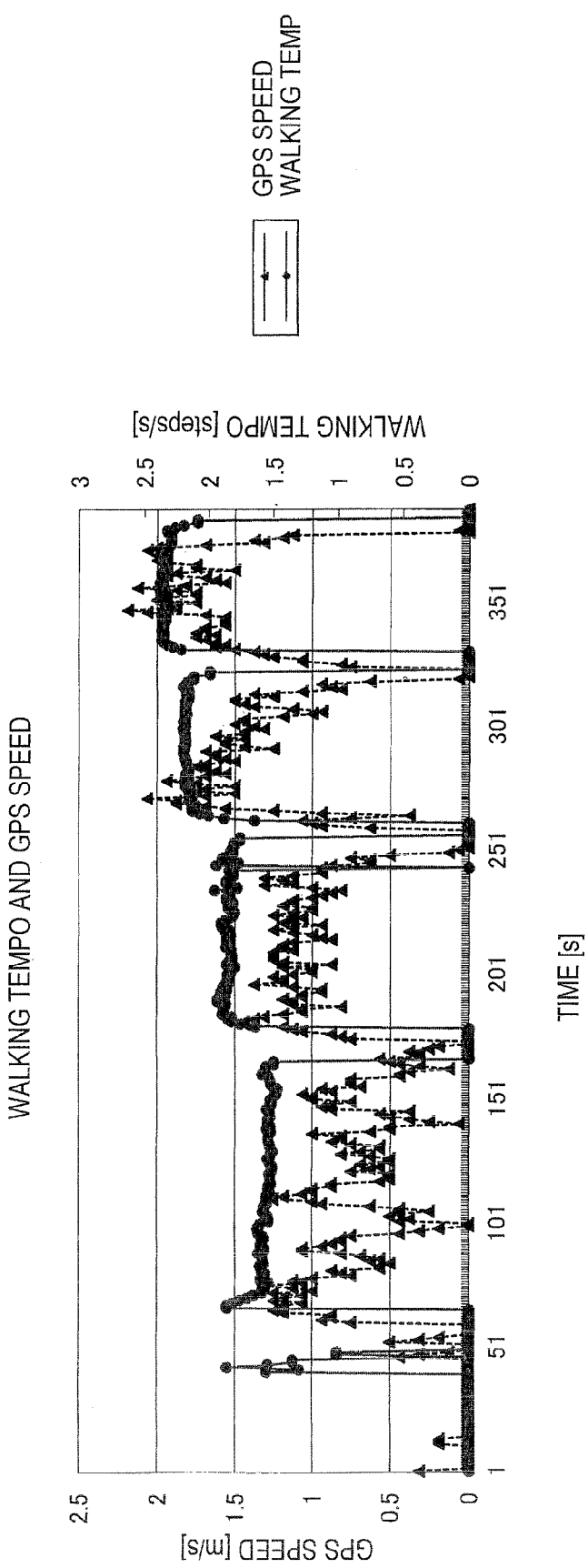
FIG. 15 is a graph showing change in the GPS speed and the walking tempo with time, which is measured under the second condition as shown in FIG. 14.
Figure 16:
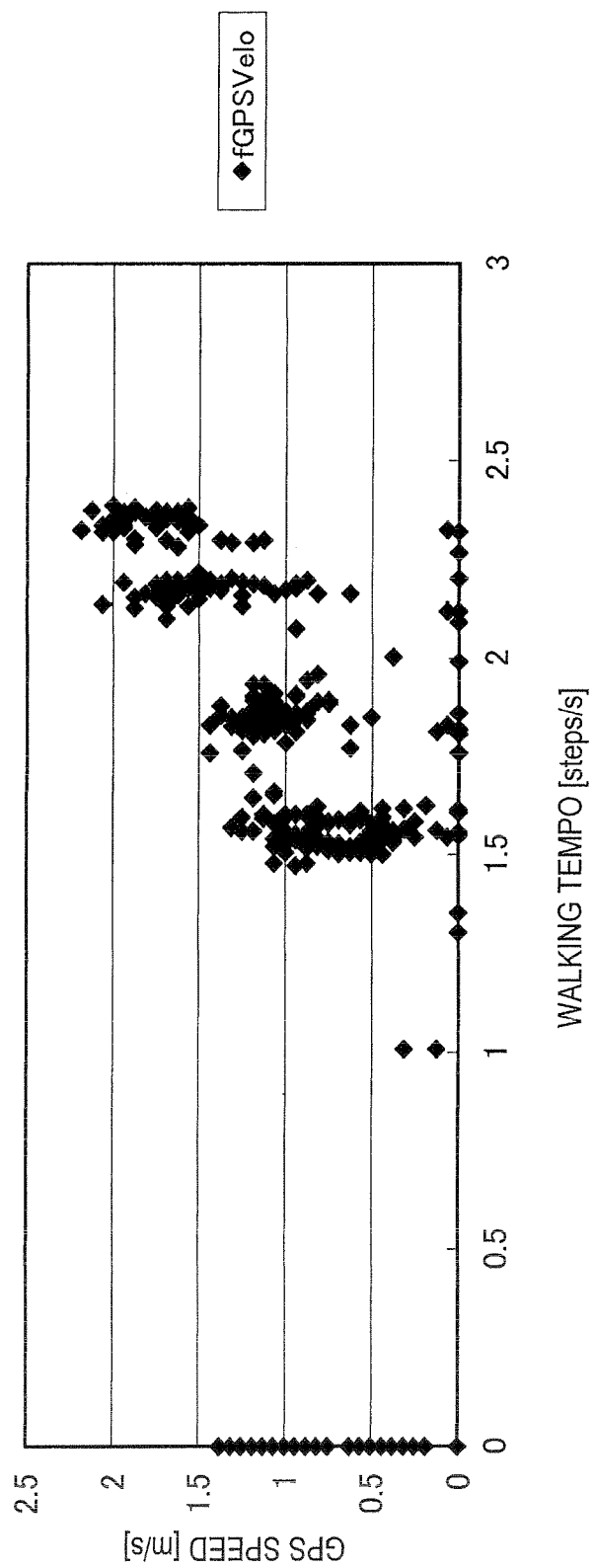
FIG. 16 is a graph showing the correspondence between the walking tempo and the GPS speed that are generated by using acquired data of FIG. 15.
Figure 17:
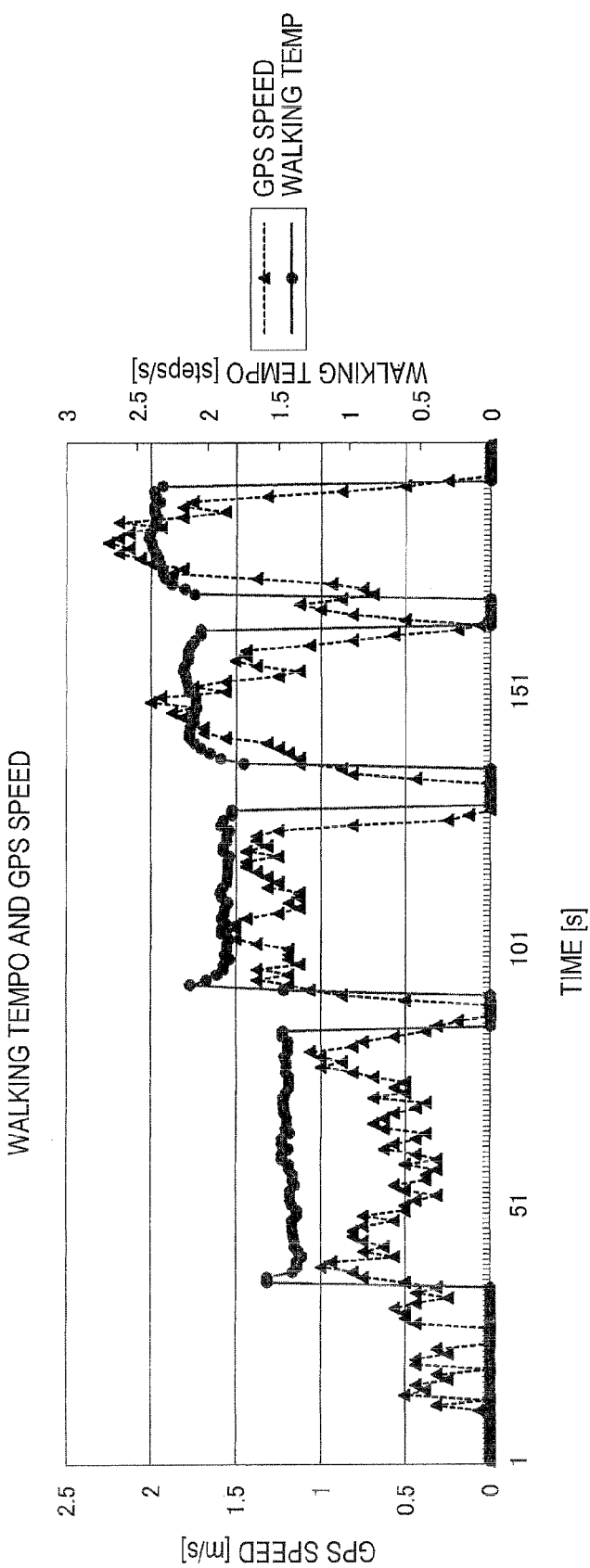
FIG. 17 is a graph showing change in the GPS speed and the walking tempo with time, which is measured under the third condition shown in FIG. 14.
Figure 18:
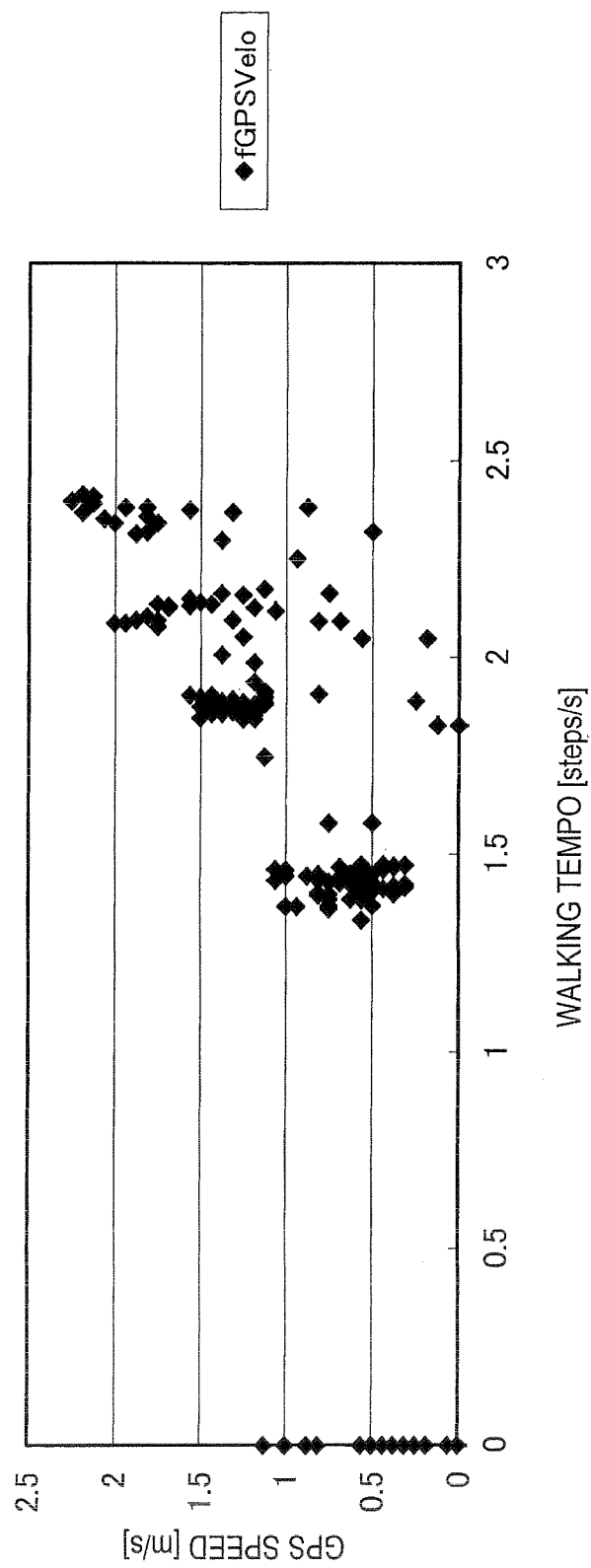
FIG. 18 is a graph showing the correspondence between the walking tempo and the GPS speed that are generated by using acquired data of FIG. 17.

Referring to FIG. 11 to FIG. 18, description will be provided on a proving test for the theory as described above. FIG. 11 is an explanatory drawing showing a first condition of the proving test on the GPS reliability evaluation of the mobile terminal according to the present embodiment. FIG. 12 is a graph showing change in the GPS speed and the walking tempo with time, which is measured under the condition of FIG. 11. FIG. 13 is a graph showing the correspondence between the walking tempo and the GPS speed that are generated from the acquired data of FIG. 12. FIG. 14 is an explanatory drawing showing a second condition and a third condition for the proving test on the GPS reliability evaluation of the mobile terminal according to the present embodiment. FIG. 15 is a graph showing change in the GPS speed and the walking tempo with time, which is measured under the second condition as shown in FIG. 14. FIG. 16 is a graph showing the correspondence between the walking tempo and the GPS speed that are generated from the acquired data of FIG. 15. FIG. 17 is a graph showing change in the GPS speed and the walking tempo with time, which is measured under the third condition shown in FIG. 14. FIG. 18 is a graph showing the correspondence between the walking tempo and the GPS speed that are generated from the acquired data of FIG. 17.

(First Condition: Proving Test in Building Street)

Referring to FIG. 11 to FIG. 13, description will now be provided on the result of the proving test in a building street under the first condition. FIG. 11 shows that the positional information acquired in a building street which is supposed to provide a poor GPS receiving sensitivity in such a manner that the positional information was acquired at four different speeds in total of two round walks between a point P1 and a point P2, and the speed was gradually increased by each way between these two points. It is understood that error of the positional information is significant although the real route is between the point 1 and the point 2 as shown by black arrows.

FIG. 12 shows acquired data regarding the walk tempo and the GPS speed acquired at this time. The values of the walking tempo reveal that there are substantially four different tempos in the traveling, which accords with the test condition.

The correspondence between the walking tempo and the GPS speed is shown in FIG. 13. If the correlation coefficient between the walking tempo and the GPS speed is high, data is supposed to be plotted in a substantially linear manner in the graph of FIG. 13. Referring to FIG. 13, the correlation between the walk tempo and the GPS speed is barely shown. Hence, it is understood that the GPS speed acquired at this place has a low reliability. Accordingly, the proving test under the first condition could prove that the correlation between the walking tempo and the GPS speed is low in a place where the reliability of the GPS is low.

(Second Condition: Proving Test at OpenSky Point)

Referring to FIG. 14 to FIG. 16, description will be provided on the result of the proving test 1 at an OpenSky point under the second condition. The OpenSky point denotes an open air place, which is supposed to provide a GPS preferable receiving environment, so that the reliability of the acquired information is high.

FIG. 14 shows the positional information acquired in an OpenSky area which is supposed to provide a preferable GPS receiving sensitivity in such a manner that the positional information was acquired at four different speeds in total of two round walks between a point P3 and a point P4, and the traveling speed was gradually increased by each way between these two points. Compared to the case of the first condition shown in FIG. 11, it is understood that discrepancy between the positional information and the real route is small.

FIG. 15 shows acquired data regarding the walking tempo and the GPS speed acquired at this time. The values of the walking tempo reveal that there are substantially four different tempos in the traveling, which accord with the test condition.

FIG. 16 shows the correspondence between the walking tempo and the GPS speed at this time. It is understood that comparing the graph of FIG. 16 to the graph of FIG. 13, the correlation between the walking tempo and the GPS speed is higher under the second condition than under the first condition. Accordingly, it could be proved that the correlation between the walking tempo and the GPS speed is high in a place where the reliability of the GPS is high.

(Third Condition: Proving Test 2 at OpenSky Point)

Referring to FIG. 14, FIG. 17 and FIG. 18, description will now be provided on the result of the proving test 2 at the OpenSky under the third condition.

FIG. 14 shows the positional information acquired in the OpenSky area which is supposed to provide a GPS preferable receiving sensitivity in such a manner that the positional information was acquired at four different speeds in total of two round walks between a point P5 and a point P6, and the speed was gradually increased by each way between these two points. As similar to the case of the second condition, compared to the case of the first condition shown in FIG. 11, it is understood that discrepancy between the positional information and the real route is small.

FIG. 17 shows acquired data regarding the walking tempo and the GPS speed acquired at this time. The values of the walking tempo reveal that there are substantially four different tempos in the traveling, which accords with the test condition.

FIG. 18 shows the correspondence between the walking tempo and the GPS speed at this time. It is understood that comparing the graph of FIG. 18 to the graph of FIG. 13, the correlation between the walking tempo and the GPS speed is higher under the third condition than under the first condition. Accordingly, it could be proved that the correlation between the walking tempo and the GPS speed is high in a place where the reliability of the GPS is high.

Accordingly, it can be considered that the reliability of the information is high if this information is acquired based on the GPS signal in an area that provides the high correlation between the GPS speed and the walking tempo. Generating the association table by using information in an area with high reliability enhances accuracy of the autonomous positioning using this association table.

<5. Examples of Other Applications of Reliability Evaluation>

Figure 19:
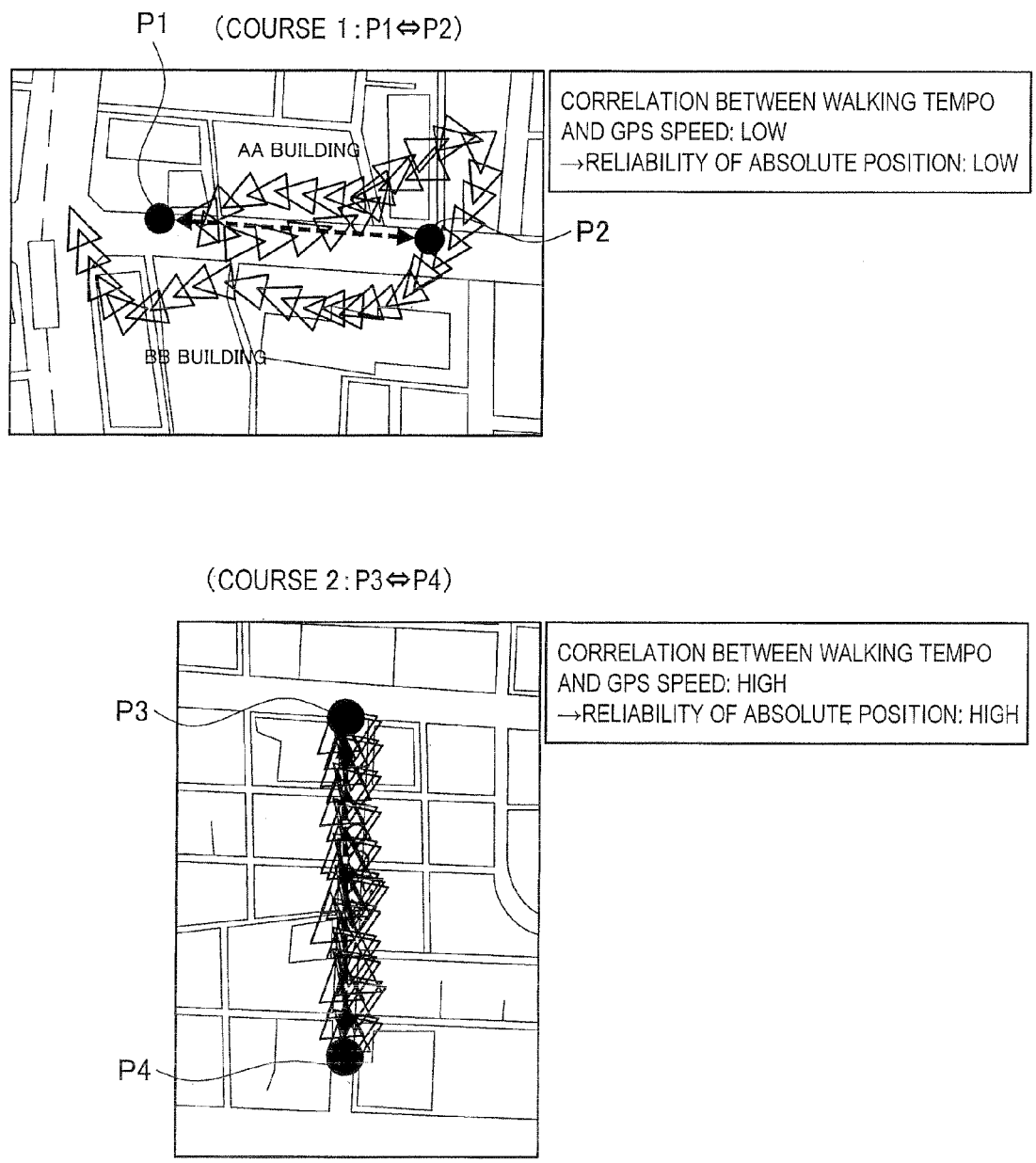
FIG. 19 is an explanatory drawing showing the example of other applications of the reliability evaluation according to the present embodiment.

Referring to FIG. 19, examples of other applications of the reliability evaluation will be described, hereinafter. FIG. 19 is an explanatory drawing showing the examples of other applications of the reliability evaluation according to the present embodiment.

In the above description, the GPS speed has been described as an example of the information calculated by using the GPS received signal, and it has been also explained that this GPS speed is used for generating the association table between the speed and the walking tempo for use in the autonomous navigation while walking. A target of the reliability evaluation is however not limited to the GPS speed. It can be said that a place where the reliability of the GPS speed is secured provides a preferable GPS receiving environment. Specifically, it can be considered that accuracy of other information calculated by using the GPS signal is secured in a place where reliability of the GPS speed is secured. An example of other information calculated by using the GPS signal may include orientation information and positional information, etc., for example.

The reliability evaluating section 105 can evaluate that the reliability of the GPS azimuth is high in a place where the reliability of the UPS speed is determined to be high. In a place where the accuracy of the GPS azimuth is secured, the reliability evaluating section 105 can use the GPS azimuth as an initial orientation when entering a building. The orientation acquiring schemes other than this GPS azimuth may include a geomagnetic orientation scheme, but error is likely to be increased as approaching the building in this geomagnetic orientation. Hence, the GPS azimuth may be more accurate than the geomagnetic orientation in some places. The autonomous positioning section 115 may determine which of the geomagnetic orientation or the GPS azimuth is used as the orientation based on the result of the evaluation on the GPS azimuth made by the reliability evaluating section 105. In the building, the orientation is often calculated by integrating angular velocity using a gyro sensor. A great error in the initial orientation may cause a significant deterioration of subsequent accuracy of the position in the building.

It can be considered that the reliability of the GPS position is high in a place where the reliability of the GPS speed is determined to be high, for example. If plural positioning schemes are available, it is important to select a positioning scheme having a higher precision depending on the place. As shown in FIG. 19, for example, it can be said that the proving test reveals that the reliability of the absolute position is low in a place where the correlation between the walking tempo and the GPS speed is low. The proving test also reveals that the reliability of the absolute position is high in a place where the correlation between the walking tempo and the GPS speed is high. The evaluation result made by the reliability evaluating section 105 may be used in determination of priority to select which positioning scheme the positional information acquiring section 111 should use. For example, the positional information acquiring section 111 can acquire the positional information acquired by using the GPS if the reliability of information acquired based on the GPS signal is high.

The preferable embodiments of the present disclosure have been described in detail with reference to the appended drawings, but the technical scope of the present disclosure is not limited to these examples. It should be understood by those skilled in the art that various modifications, combinations, sub-combinations and alterations may occur depending on design requirements and other factors insofar as they are within the scope of the appended claims or the equivalents thereof, and they belong to the technical scope of the present disclosure.

For example, in the above described embodiments, the GPS has been explained as an example of the positioning signal transmitter, but the present technology is not limited to this example, and applicable to general information processing apparatuses using various positioning signal transmitters such as the GPS. An example of the positioning signal transmitter may include various positioning satellites such GALILEO, GLONASS, HOKUTO, and MICHIBIKI, etc. In this case, one satellite may be used as the positioning satellite, or positioning signals from plural satellites may be used in combination thereof. An example of the positioning signal transmitter other than the positioning satellite may include various positioning signal transmitters for use in the indoor positioning. An example of a technique used in the indoor positioning may include IMES (indoor messaging system) that is also referred to as an indoor GPS, visible light communication, infrared communication, an RFID (radio frequency identification) tag, a QR (quick response) code, etc. The configuration of the structural elements to be used may be appropriately changed in accordance with the technical level at the time of carrying out the technique.

In the above described embodiments, the information processing apparatus having the WiFi positioning section in addition to the functions of the autonomous positioning and the satellite positioning has been explained, but the present technology is not limited to this example. The information processing apparatus to which the present technique is applied may have no positioning function but the autonomous positioning and the satellite positioning. The information processing apparatus to which the present technique is applied may be a device having a positioning function other than the WiFi positioning.

In the above described embodiments, the device for generating the association table between the walking tempo and the traveling speed, and the device for using this association table have been described as an identical device, but the present technique is not limited to this example. For example, the device for generating the association table and the device for using this association table may be embodied as separate devices.

In the above described embodiments, the term referred to as the "walking tempo" has been used, and this term denotes a pitch at which the user travels. The word "walking" is used in this term, but needless to say that this term has a concept also including jogging or running with short steps.

In the present specification, the steps described in the flow charts include not only processing chronologically executed in order of the description, but also processing executed in parallel or separately without being chronologically executed. Needless to say that even in the steps for chronologically executing the processing, the order of executing the processing may be changed appropriately.

Additionally, the present technology may also be configured as below.

(1) An information processing apparatus including:
a speed calculating section configured to calculates a traveling speed of a user based on a signal received from a positioning signal transmitter;
a walking tempo acquiring section configured to acquire a walking tempo of the user; and
an evaluating section configured to evaluate, based on the walking tempo and the traveling speed, reliability of information calculated by using the signal received from the positioning signal transmitter.

(2) The information processing apparatus according to (1), wherein
the evaluating section evaluates the reliability based on a correlation coefficient between the walking tempo and the traveling speed if dispersion of the walking tempo is equal to or more than a predetermined threshold value, and evaluates the reliability based on frequency distribution of the traveling speed if the dispersion of the walking tempo is less than the predetermined threshold value.

(3) The information processing apparatus according to (1) or (2), wherein
the evaluating section evaluates the reliability of the traveling speed calculated based on the signal received from the positioning signal transmitter, and
the information processing apparatus further includes a table generating section for generating an association table between the traveling speed and the walking tempo by using the traveling speed that is determined to be equal to or more than a predetermined level based on a result of the evaluation.

(4) The information processing apparatus according to (3), further including
a position calculating section configured to calculate a position of the user by using the association table generated by the table generating section.

(5) The information processing apparatus according to (4), further including
a display controlling section configured to display in a superimposed manner the position calculated by the position calculating section on a map.

(6) The information processing apparatus according to any one of (1) to (5), wherein
the information calculated by using the signal received from the positioning transmitter is positional information.

(7) The information processing apparatus according to any one of (1) to (6), wherein
the information calculated by using the signal received from the positioning transmitter is orientation information.

(8) An information processing apparatus including:
a walking tempo acquiring section configured to acquire a walking tempo of a user;
a traveling speed acquiring section configured to acquire a traveling speed extracted, based on the walking tempo acquired by the walking tempo acquiring section, from an association table between the traveling speed and the walking tempo generated by using the traveling speed whose reliability is evaluated based on a correlation between the traveling speed calculated based on a signal received from a positioning signal transmitter and the walking tempo; and
a position calculating section configured to calculate the position of the user based on the traveling speed.

(9) The information processing apparatus according to (8), further including
a display controlling section configured to display in a superimposed manner the position calculated by the position calculating section on a map.

(10) An information processing method including:
calculating a traveling speed of a user based on a signal received from a positioning signal transmitter;
acquiring a walking tempo of the user; and
evaluating, based on the walking tempo and the traveling speed, reliability of information calculated by using the signal received from the positioning signal transmitter.

(11) A program allowing a computer to function as an information processing apparatus, the information processing apparatus including:
a speed calculating section configured to calculates a traveling speed of a user based on a signal received from a positioning signal transmitter;
a walking tempo acquiring section configured to acquire a walking tempo of the user; and
an evaluating section configured to evaluate, based on the walking tempo and the traveling speed, reliability of information calculated by using the signal received from the positioning signal transmitter.

The present disclosure contains subject matter related to that disclosed in Japanese Priority Patent Application JP 2012-080987 filed in the Japan Patent Office on Mar. 30, 2012, the entire content of which is hereby incorporated by reference.

What is claimed is:
1. An information processing apparatus comprising:
a speed calculating section configured to calculate a traveling speed of a user based on a signal received from a positioning signal transmitter;
a walking tempo acquiring section configured to acquire a walking tempo of the user;
an evaluating section configured to evaluate reliability of the calculated traveling speed based on the walking tempo and to evaluate reliability of information calculated by using the signal received from the positioning signal transmitter, and
a table generating section for generating an association table between the traveling speed and the walking tempo by using the traveling speed determined to be equal to or more than a predetermined level based on a result of the evaluations by the evaluating section.

2. The information processing apparatus according to claim 1, wherein
the evaluating section evaluates the reliability of the traveling speed based on a correlation coefficient between the walking tempo and the traveling speed if dispersion of the walking tempo is equal to or more than a predetermined threshold value, and evaluates the reliability of the traveling speed based on frequency distribution of the traveling speed if the dispersion of the walking tempo is less than the predetermined threshold value.

3. The information processing apparatus according to claim 1, further comprising
a position calculating section configured to calculate a position of the user by using the association table generated by the table generating section.

4. The information processing apparatus according to claim 3, further comprising
a display controlling section configured to display in a superimposed manner the position calculated by the position calculating section on a map.

5. The information processing apparatus according to claim 1, wherein
the information calculated by using the signal received from the positioning transmitter is positional information.

6. The information processing apparatus according to claim 1, wherein
the information calculated by using the signal received from the positioning transmitter is orientation information.

7. An information processing apparatus comprising:
a walking tempo acquiring section configured to acquire a walking tempo of a user;
a traveling speed acquiring section configured to acquire a traveling speed extracted, based on the walking tempo acquired by the walking tempo acquiring section, from an association table between the traveling speed and the walking tempo, the association table being generated by using the traveling speed determined to be equal to or more than a predetermined level and whose reliability is evaluated based on a correlation between the traveling speed calculated from a signal received from a positioning signal transmitter and the walking tempo; and
a position calculating section configured to calculate the position of the user based on the traveling speed.

8. The information processing apparatus according to claim 7, further comprising
a display controlling section configured to display in a superimposed manner the position calculated by the position calculating section on a map.

9. An information processing method comprising:
calculating, using a processor, a traveling speed of a user based on a signal received from a positioning signal transmitter;
acquiring, by using the processor, a walking tempo of the user;
evaluating, by the processor, the reliability of the calculated traveling speed based on the walking tempo and evaluating reliability of information calculated by using the signal received from the positioning signal transmitter, and
using the processor to generate an association table between the traveling speed and the walking tempo by using the traveling speed determined to be equal to or more than a predetermined level based on a result of the evaluations.

10. A program allowing a computer to function as an information processing apparatus, the information processing apparatus including:
a speed calculating section configured to calculates a traveling speed of a user based on a signal received from a positioning signal transmitter;
a walking tempo acquiring section configured to acquire a walking tempo of the user;
an evaluating section configured to evaluate reliability of the calculated traveling speed based on the walking tempo and to evaluate reliability of information calculated by using the signal received from the positioning signal transmitter, and
a table generating section for generating an association table between the traveling speed and the walking tempo by using the traveling speed determined to be equal to or more than a predetermined level based on a result of the evaluations by the evaluating section.

* * * * *